United States Patent
Bergen et al.

(10) Patent No.: US 10,776,902 B2
(45) Date of Patent: Sep. 15, 2020

(54) IMAGE PROCESSING DEVICE AND METHOD FOR PRODUCING IN REAL-TIME A DIGITAL COMPOSITE IMAGE FROM A SEQUENCE OF DIGITAL IMAGES

(71) Applicant: Fraunhofer-Gesellschaft zur Foerderung der angewandten Forschung e.V., Munich (DE)

(72) Inventors: Tobias Bergen, Erlangen (DE); Michaela Benz, Erlangen (DE); Andreas Ernst, Weiden (DE); Thomas Wittenberg, Erlangen (DE); Christian Muenzenmayer, Hagenbuechach (DE); Frederik Zilly, Stuttgart (DE); Malte Avenhaus, Fuerth (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/427,103

(22) Filed: May 30, 2019

(65) Prior Publication Data
US 2019/0279338 A1    Sep. 12, 2019

Related U.S. Application Data

(63) Continuation of application No. PCT/EP2016/079324, filed on Nov. 30, 2016.

(51) Int. Cl.
*H04N 5/232* (2006.01)
*G06T 3/40* (2006.01)
(Continued)

(52) U.S. Cl.
CPC .......... *G06T 3/4038* (2013.01); *G06K 9/4609* (2013.01); *G06K 9/4642* (2013.01);
(Continued)

(58) Field of Classification Search
CPC ........ H04N 2005/2255; H04N 5/23238; G06T 3/4038; G06T 5/50; G06T 5/002
See application file for complete search history.

(56) References Cited

U.S. PATENT DOCUMENTS 10,096,114 B1 *   10/2018   Lasenby .............. H04N 17/002
2012/0201466 A1   8/2012   Funayama et al.
(Continued)

OTHER PUBLICATIONS

Motilal Agrawal, et al., "CenSurE: Center Surround Extremas for Realtime Feature Detection and Matching", In David Forsyth, Philip Torr, and Andrew Zisserman, editors, European Conference on Computer Vision (ECCV), Lecture Notes in Computer Science, pp. 102-115. Springer Berlin Heidelberg, 2008. 00255.
(Continued)

*Primary Examiner* — Tsion B Owens
(74) *Attorney, Agent, or Firm* — Michael A. Glenn; Perkins Coie LLP

(57) ABSTRACT

Image processing device for producing in real-time a digital composite image from a sequence of digital images recorded by a camera device, in particular an endoscopic camera device, the image processing device including a selecting unit, a key point detection unit, a transforming unit and a joining unit,
wherein the key point detection unit includes a maximum detection unit configured for executing following steps separately for the filter response for the reference image and for the filter response for the further image, wherein a variable threshold is used:
i) creating blocks by dividing the respective filter response,
ii) calculating the variable threshold for each of the blocks,
iii) discarding those blocks of the blocks from further consideration, in which the respective filter response at a reference point of the respective block is less than the respective variable threshold.

12 Claims, 5 Drawing Sheets

(51) Int. Cl.
G06T 5/00 (2006.01)
G06T 5/50 (2006.01)
G06K 9/56 (2006.01)
G06K 9/46 (2006.01)
G06K 9/62 (2006.01)
G06T 7/33 (2017.01)
H04N 5/225 (2006.01)
G06K 9/20 (2006.01)

(52) U.S. Cl.
CPC ............ *G06K 9/4647* (2013.01); *G06K 9/56* (2013.01); *G06K 9/6215* (2013.01); *G06T 5/002* (2013.01); *G06T 5/50* (2013.01); *G06T 7/337* (2017.01); *H04N 5/23238* (2013.01); G06K 2009/2045 (2013.01); G06K 2009/4666 (2013.01); G06T 2200/32 (2013.01); G06T 2207/10068 (2013.01); G06T 2207/20021 (2013.01); G06T 2207/30004 (2013.01); H04N 2005/2255 (2013.01)

(56) References Cited

U.S. PATENT DOCUMENTS

2014/0270537 A1  9/2014  Lo et al.
2014/0300686 A1* 10/2014  Campbell .......... H04N 5/23238
                                            348/36

OTHER PUBLICATIONS

Alexandre Alani, et al., "FREAK: Fast Retina Keypoint", In IEEE Conference on Computer Vision and Pattern Recognition (CVPR), pp. 510-517, 2012. 00264.
Sharib Ali, et al., "Robust bladder image registration by redefining data-term in total variational approach", In International Society for Optics and Photonics (SPIE), vol. 9413, pp. 94131H-94131H-12, 2015. 00000.
Douglas N. Arnold, et al., "Moebius transformations revealed", Notices of the American Mathematical Society AMS 55(10):1226-1231, 2008.
Marko Babjuk, et al., "EAU guidelines on non-muscle-invasive urothelial carcinoma of the bladder: update 2013", European Urology, 64(4):639-653, 2013. 0415.
Tim Bailey, et al., "Simultaneous localization and mapping Part II", IEEE Robotics & Automation Magazine, 13(3):108-117, 2006. 00691.
Joao Barreto, et al., "Automatic Camera Calibration Applied to Medical Endoscopy", In British Machine Vision Conference (BMVC), pp. 1-10, London, 2009. 00017.
A. Bartoli, et al., "On template-based reconstruction from a single view: Analytical solutions and proofs of well-posedness for developable, isometric and conformal surfaces", In IEEE Conference on Computer Vision and Pattern Recognition (CVPR), pp. 2026-2033, Jun. 2012. 00019.
Herbert Bay, et al., "SURF: Speeded-up robust features", Computer Vision and Image Understanding, 110(3):346-359, 2008. 03685.
Herbert Bay, et al., "SURF: Speeded Up Robust Features", In Ales Leonardis, Horst Bischof, and Axel Pinz, editors, European Conference on Computer Vision (ECCV), Lecture Notes in Computer Science, pp. 404-417. Springer Berlin Heidelberg, 2006. 04629.
Douglas E. Becker, et al., "Image processing algorithms for retinal montage synthesis, mapping, and real-time location determination", IEEE Transactions on Biomedical Engineering, 45(1):105-118, 1998.
Noah Bedard, et al., "Real-time video mosaicing with a high-resolution microendoscope", Biomedical Optics Express, 3(10):2428-2435, 2012. 00003.
Alexander Behrens, "Creating panoramic images for bladder fluorescence endoscopy" Acta Polytechnica Journal of Advanced Engineering 48(3):50-54, 2008. 00026.

Alexander Behrens, et al., "Real-time image composition of bladder mosaics in fluorescence endoscopy", Computer Science—Research and Development, 26(1-2):51-64, 2011. 00016.
Alexander Behrens, et al., "Intensity based multi-scale blending for panoramic images in fluorescence endoscopy", In IEEE International Symposium on Biomedical Imaging: From Nano to Macro (ISBI), pp. 1305-1308, 2010. 00004.
Alexander Behrens, et al., "Local and global panoramic imaging for fluorescence bladder endoscopy", In IEEE International Conference of the Engineering in Medicine and Biology Society (EMBC), pp. 6990-6993, 2009. 00023.
Alexander Behrens, et al., "Gap detection in endoscopic video sequences using graphs", In IEEE International Conference of the Engineering in Medicine and Biology Society (EMBC), pp. 6635-6638, 2011. 00001.
Alexander Behrens, et al., "A multi-threaded mosaicking algorithm for fast image composition of fluorescence bladder images", In International Society for Optics and Photonics (SPIE), pp. 76252S-76252S-10, 2010. 00012.
Alexander Behrens, et al., "A non-linear multi-scale blending algorithm for fluorescence bladder images", Computer Science—Research and Development, 26(1):125-134, 2011. 00003.
Alexander Behrens, et al., "2D and 3D visualization methods of endoscopic panoramic bladder images", In Kenneth H. Wong and David R. Holmes III, editors, International Society for Optics and Photonics (SPIE), vol. 7964, pp. 796408-796408-8, 2011. 00000.
Alexander Behrens, et al., "Analysis of Feature Point Distributions for Fast Image Mosaicking Algorithms", Acta Polytechnica Journal of Advanced Engineering, 50(4):12-18, 2010. 00001.
Achraf Ben-Hamadou, et al., "A novel 3D surface construction approach: Application to three-dimensional endoscopic data", In IEEE International Conference on Image Processing (ICIP), pp. 4425-4428, 2010. 00005.
Achraf Ben Hamadou, et al., "Comparative study of image registration techniques for bladder video-endoscopy", In International Society for Optics and Photonics (SPIE), vol. 7371, pp. 737118-737118-7, 2009. 00006.
Tobias Bergen, et al., "Stitching and Surface Reconstruction From Endoscopic Image Sequences: A Review of Applications and Methods", IEEE Journal of Biomedical and Health Informatics, 20(1):304-321, 2016. 00005.
T. Bergen, et al., "Image stitching of sphenoid sinuses from monocular endoscopic views", In Wolfgang Freysinger, editor, Jahrestagung der Deutschen Gesellschaft für Computer- und Roboterassistierte Chirurgie (CURAC), pp. 226-229, Innsbruck, 2013. 00000.
Tobias Bergen, et al., "A hybrid tracking approach for endoscopic real-time panorama imaging", In International Journal for Computer Assisted Radiology and Surgery, vol. 8 Suppl. 1, pp. 52-354, 2013. 00004.
Tobias Bergen, et al., "Shading correction for endoscopic images using principal color components", International Journal of Computer Assisted Radiology and Surgery, 11(3):397-405, 2015. 00000.
J. Bernal, et al., "Feature Detectors and Feature Descriptors: Where we are now", Technical Report 154, Computer Vision Center & Computer Science Department Universitat Autonoma de Barcelona, 2010. 00006.
Sylvain Bernhardt, "Robust Dense Endoscopic Stereo Reconstruction for Minimally Invasive Surgery", In Proceedings of the Second International Conference on Medical Computer Vision: Recognition Techniques and Applications in Medical Imaging (MVC), pp. 254-262. Springer Berlin Heidelberg, 2013. 00010.
Henri Bouma, et al., "Streaming video-based 3D reconstruction method compatible with existing monoscopic and stereoscopic endoscopy systems", In International Society for Optics and Photonics (SPIE), vol. 8371, pp. 837112-837112-10, Baltimore, MD, 2012. 00001.
Duane C. Brown, "Close-Range Camera Calibration", Photogrammetric Engineering, 37(8):855-866, 1971. 01392.
Lisa Gottesfeld Brown, "A Survey of Image Registration Techniques", ACM Computing Surveys, 24(4):325-376, 1992. 04420.
M. Brown, et al., "Recognising panoramas", In IEEE International Conference on Computer Vision (ICCV), vol. 2, pp. 1218-1225, 2003.

(56) References Cited

OTHER PUBLICATIONS

Matthew Brown, et al., "Automatic panoramic image stitching using invariant features", International Journal of Computer Vision, 74(1):59-73, 2007. 00693.

Matthew R. Burkhardt, et al., "Controlling the Trajectory of a Flexible Ultrathin Endoscope for Fully Automated Bladder Surveillance", IEEE/ASME Transactions on Mechatronics, 19(1):366-373, 2013. 00000.

Darius Burschka, et al., "V-GPS (SLAM): Vision-based inertial system for mobile robots", In IEEE International Conference on Robotics and Automation (ICRA), vol. 1, pp. 409-415, 2004. 00058.

Darius Burschka, et al., "Scale-invariant registration of monocular endoscopic images to CT-scans for sinus surgery", Medical Image Analysis, 9(5):413-426, 2005. 00056.

Michael Calonder, et al., "Brief: Binary Robust Independent Elementary Features", In Kostas Daniilidis, Petros Maragos, and Nikos Paragios, editors, European Conference on Computer Vision (ECCV), Lecture Notes in Computer Science, pp. 778-792. Springer Berlin Heidelberg, 2010. 00703.

Ali Can, et al., "A feature-based, robust, hierarchical algorithm for registering pairs of images of the curved human retina", IEEE Transactions on Pattern Analysis and Machine Intelligence, 24(3):347-364, 2002.

Robert E. Carroll, et al., "Rectified Surface Mosaics", International Journal of Computer Vision, 85(3):307-315, 2009.

Robert Castle, et al., "Video-rate localization in multiple maps for wearable augmented reality", In IEEE International Symposium on Wearable Computers (ISWC), pp. 15-22, 2008. 00125.

Philippe C. Cattin, et al., "Retina Mosaicing Using Local Features", In Rasmus Larsen, Mads Nielsen, and Jon Sporring, editors, International Conference on Medical Image Computing and Computer-Assisted Intervention (MICCAI), Lecture Notes in Computer Science, pp. 185-192. Springer Berlin Heidelberg, 2006.

Ping-Lin Chang, et al., "Real-Time Dense Stereo Reconstruction Using Convex Optimisation with a Cost-Volume for Image-Guided Robotic Surgery", In Kensaku Mori, Ichiro Sakuma, Yoshinobu Sato, Christian Barillot, and Nassir Navab, editors, International Conference on Medical Image Computing and Computer-Assisted Intervention (MICCAI), Lecture Notes in Computer Science, pp. 42-49. Springer Berlin Heidelberg, 2013. 00007.

Chao-I Chen, et al., "Modeling tumor/polyp/lesion structure in 3D for computer-aided diagnosis in colonoscopy", In International Society for Optics and Photonics (SPIE), vol. 7625, pp. 76252F-76252F-8, 2010. 00002.

Tae Eun Choe, et al., "Optimal Global Mosaic Generation from Retinal Images", In International Conference on Pattern Recognition (ICPR), vol. 3, pp. 681-684, 2006.

Ondřej Chum, et al., "Locally Optimized RANSAC", In Bernd Michaelis and Gerald Krell, editors, Joint Pattern Recognition Symposium, Lecture Notes in Computer Science, pp. 236-243. Springer Berlin Heidelberg, 2003.

Gastone Ciuti, et al., "Intra-operative monocular 3D Reconstruction for image-guided navigation in active locomotion capsule endoscopy", In IEEE International Conference on biomedical Robotics and Biomechatronics (BioRob), pp. 768-774, 2012. 00009.

Javier Civera, et al., "Inverse Depth Parametrization for Monocular SLAM", IEEE Transactions on Robotics, 24(5):932-945, 2008. 00259.

Javier Civera, et al., "1-Point RANSAC for EKF Filtering: Application to Real-Time Structure from Motion and Visual Odometry", Journal of Field Robotics, 27(5):609-631, 2010. 00000.

Javier Civera, et al., "Dimensionless Monocular SLAM", In Joan Marti, Jose Benedi, Ana Mendonca, and Joan Serrat, editors, Iberian Conference on Pattern Recognition and Image Analysis, vol. 4478 of Lecture Notes in Computer Science, pp. 412-419, 2007.

Philip J. Clark, et al., "Distance to Nearest Neighbor as a Measure of Spatial Relationships in Populations", Ecology, 35(4):445-453, 1954. 03245.

Franklin C. Crow, "Summed-area Tables for Texture Mapping", In International Conference on Computer Graphics and Interactive Techniques (SIGGRAPH), pp. 207-212, New York, NY, USA, 1984. ACM. 01305.

C. Daul, et al., "From 2D towards 3D cartography of hollow organs", In IEEE International Conference on Electrical Engineering, Computing Science and Automatic Control (CCE), pp. 285-293, 2010. 00004.

Andrew J. Davison, et al., "MonoSLAM: Real-time single camera SLAM", IEEE Transactions on Pattern Analysis and Machine Intelligence, 29(6):1052-1067, 2007. 01210.

Hugh Durrant-Whyte, et al., "Simultaneous Localization and Mapping (SLAM): Part I The Essential Algorithms", IEEE Robotics & Automation Magazine, 13(2):99-110, 2006. 01363.

Ethan Eade, et al., "Scalable Monocular SLAM", In IEEE Computer Society Conference on Computer Vision and Pattern Recognition (CVPR), vol. 1, pp. 469-476, 2006. 00347.

John N. Eble, et al., "Pathology and genetics of tumours of the urinary system and male genital organs", Weltgesundheitsorganisation, and International Agency for Research on Cancer, editors, No. 6 in World Health Organization classification of tumours. IARC ress, Lyon, 2006. 00000.

Andreas Ernst, et al., "Check My Chart: A Robust Color Chart Tracker for Colorimetric Camera Calibration", In International Conference on Computer Vision / Computer Graphics Collaboration Techniques and Applications (MIRAGE), pp. 5:1-5:8, New York, NY, USA, 2013. 00001.

Yichen Fan, et al., "3D reconstruction of wireless capsule endoscopy images", In IEEE International Conference of the Engineering in Medicine and Biology Society (EMBC), pp. 5149-5152, 2010. 00006.

Martin A. Fischler, et al., "Random Sample Consensus: A Paradigm for Model Fitting with Applications to Image Analysis and Automated Cartography", Communications of the ACM, 24(6):381-395, 1981. 09771.

Ioana N. Fleming, et al., "Intraoperative Visualization of Anatomical Targets in Retinal Surgery", In IEEE Workshop on Applications of Computer Vision (WACV), pp. 1-6, 2008.

Wolfgang Förstner, et al., "A fast operator for detection and precise location of distinct points, corners and centres of circular features", In Intercommission Conference on Fast Processing of Photogrammetric Data (ISPRS), pp. 281-305, 1987. 00953.

Steffen Gauglitz, et al., "Evaluation of interest point detectors and feature descriptors for visual tracking", International Journal of Computer Vision, 94(3):335-360, 2011. 00126.

Stamatia Giannarou, et al., "Deformable structure from motion by fusing visual and inertial measurement data", In IEEE/RSJ International Conference on Intelligent Robots and Systems (IROS), pp. 4816-4821, 2012. 00002.

Stamatia Giannarou, et al., Tissue Deformation Recovery with Gaussian Mixture Model Based Structure from Motion. In Cristian A. Linte, John T. Moore, Elvis C. S. Chen, and David R. Holmes III, editors, International Conference on Augmented Environments for Computer-Assisted Interventions, Lecture Notes in Computer Science, pp. 47-57. Springer Berlin Heidelberg, 2012. 00003.

A. Ardeshir Goshtasby, "2-D and 3-D Image Registration: for Medical, Remote Sensing, and Industrial Applications", John Wiley & Sons, 2005. 00457.

Michael Grabner, et al., "Fast Approximated SIFT", In P. J. Narayanan, Shree K. Nayar, and Heung-Yeung Shum, editors, Asian Conference on Computer Vision (ACCV), Lecture Notes in Computer Science, pp. 918-927. Springer Berlin Heidelberg, 2006. 00193.

Oscar G. Grasa, et al., "EKF Monocular SLAM 3D Modeling, Measuring and Augmented Reality from Endoscope Image Sequences", In International Conference on Medical Image Computing and Computer-Assisted Intervention (MICCAI), vol. 2, pp. 102-109, 2009. 00011.

Oscar G. Grasa, et al., "EKF monocular SLAM with relocalization for laparoscopic sequences", In IEEE International Conference on Robotics and Automation (ICRA), pp. 4816-4821, 2011.

Chris Harris, et al., "A combined corner and edge detector", In Alvey Vision Conference, vol. 15, p. 50, Manchester, UK, 1988. 10097.

(56) References Cited

OTHER PUBLICATIONS

Richard Hartley, et al., "Parameter-Free Radial Distortion Correction with Center of Distortion Estimation", IEEE Transactions on Pattern Analysis and Machine Intelligence, 29(8):1309-1321, 2007. 00178.

Richard Hartley, et al., "Multiple View Geometry in Computer Vision", Cambridge University Press, second edition, 2004. 00002.

Janne Heikkilä, et al., "A four-step camera calibration procedure with implicit image correction", In IEEE Computer Society Conference on Computer Vision and Pattern Recognition (CVPR), pp. 1106-1112, 1997. 01301.

Yahir Hernández-Mier, et al., "Fast construction of panoramic images for cystoscopic exploration", Computerized Medical Imaging and Graphics, 34(7):579-592, 2010. 00019.

Mathis Hoffmann, et al., "A Robust Chessboard Detector for Geometric Camera Calibration", In Submitted for publication at International Joint Conference on Computer Vision, Imaging and Computer Graphics Theory and Applications, VISAPP, 2017. 00000.

Dongho Hong, et al., "3D Reconstruction of Colon Segments from Colonoscopy Images", In IEEE International Conference on Bioinformatics and BioEngineering (BIBE), pp. 53-60, 2009. 00008.

Mingxing Hu, et al., "A robust mosaicing method for robotic assisted minimally invasive surgery", In International Conference on Informatics in Control, Automation and Robotics (ICINCO), vol. 2, pp. 206- 211, Funchal, 2010. 00000.

Mingxing Hu, et al., "3D Reconstruction of Internal Organ Surfaces for Minimal Invasive Surgery", In Nicholas Ayache, Sebastien Ourselin, and Anthony Maeder, editors, International Conference on Medical Image Computing and Computer-Assisted Intervention (MICCAI), Lecture Notes in Computer Science, pp. 68-77. Springer Berlin Heidelberg, 2007. 00029.

Mingxing Hu, et al., "Reconstruction of a 3D surface from video that is robust to missing data and outliers: Application to minimally invasive surgery using stereo and mono endoscopes", Medical Image Analysis, 16(3):597-611, 2012. 00017.

Dimitris K. Iakovidis, et al., "Efficient Nomography-Based Video Visualization for Wireless Capsule Endoscopy", In IEEE International Conference on Bioinformatics and BioEngineering (BIBE), pp. 1-4, 2013.

Tatsuo Igarashi, et al., "Computer-based endoscopic image-processing technology for endourology and laparoscopic surgery", International Journal of Urology, 16(6):533-543, 2009. 00008.

Takuro Ishii, et al., "Urine Flow Dynamics Through Prostatic Urethra With Tubular Organ Modeling Using Endoscopic Imagery", IEEE Journal of Translational Engineering in Health and Medicine, 2:1-9, 2014.

Juho Kannala, et al., "A generic camera model and calibration method for conventional, wide-angle, and fish-eye lenses", IEEE Transactions on Pattern Analysis and Machine Intelligence, 28(8):1335-1340, 2006. 00199.

Alexandros Karargyris, et al., "Three-Dimensional Reconstruction of the Digestive Wall in Capsule Endoscopy Videos Using Elastic Video Interpolation", IEEE Transactions on Medical Imaging, 30(4):957-971, 2011. 00027.

Arie Kaufman, et al., "3D Surface Reconstruction from Endoscopic Videos", Visualization in Medicine and Life Sciences, pp. 61-74, 2008. 00011.

J. Kiefer, "Sequential Minimax Search for a Maximum", Proceedings of the American Mathematical Society, 4(3):502-506, 1953. 00639.

Richard Kim, et al., "Quantitative endoscopy: Precise computerized measurement of metaplastic epithelial surface area in Barrett's esophagus", Gastroenterology, 108(2):360-366, 1995. 00034.

Georg Klein, et al., "Parallel Tracking and Mapping for Small AR Workspaces", In IEEE/ACM International Symposium on Mixed and Augmented Reality (ISMAR), pp. 225-234, 2007. 01639.

Georg Klein, et al., "Parallel Tracking and Mapping on a camera phone", In IEEE/ACM International Symposium on Mixed and Augmented Reality (ISMAR), pp. 83-86, 2009. 00325.

Wolfgang Konen, et al., "Endoscopic image mosaics for real-time color video sequences", In International Journal of Computer Assisted Radiology and Surgery, vol. 2 Suppl. 1, pp. 224-225, 2007. 00007.

Dan Koppel, et al., "Toward automated model building from video in computer-assisted diagnoses in colonoscopy", In International Society for Optics and Photonics (SPIE), vol. 6509, pp. 65091L-65091L-9, 2007. 00023.

Masakatsu Kourogi, et al., "Real-time image mosaicing from a video sequence", In IEEE International Conference on Image Processing (ICIP), vol. 4, pp. 133-137, 1999.

Vincent Lepetit, et al., "Keypoint recognition using randomized trees", IEEE Transactions on Pattern Analysis and Machine Intelligence, 28(9):1465-1479, 2006. 00509.

Mirna Lerotic, et al., "Dynamic View Expansion for Enhanced Navigation in Natural Orifice Transluminal Endoscopic Surgery", In Dimitris Metaxas, Leon Axel, Gabor Fichtinger, and Gabor Szekely, editors, International Conference on Medical Image Computing and Computer-Assisted Intervention (MICCAI), Lecture Notes in Computer Science, pp. 467-475. Springer Berlin Heidelberg, 2008. 00017.

Stefan Leutenegger, et al., "BRISK: Binary Robust Invariant Scalable Keypoints", In IEEE International Conference on Computer Vision (ICCV), pp. 2548-2555, 2011. 00398.

Wenjing Li, et al., "Robust distortion correction of endoscope", In International Society for Optics and Photonics (SPIE), vol. 6918, pp. 691812-691812-8, 2008. 00005.

Rainer Lienhart, et al., "An Extended Set of Haar-like Features for Rapid Object Detection", In IEEE International Conference on Image Processing (ICIP), vol. 1, pp. 900-903, 2002.

Yuping Lin, et al., "Map-Enhanced UAV Image Sequence Registration and Synchronization of Multiple Image Sequences", In IEEE Computer Society Conference on Computer Vision and Pattern Recognition (CVPR), pp. 1-7, 2007. 00072.

Tony Lindeberg, "Scale-Space Theory in Computer Vision", Springer Science & Business Media, 1993. 02106.

Tony Lindeberg, "Scale-space theory: a basic tool for analyzing structures at different scales", Journal of Applied Statistics, 21(1-2):225-270, 1994. 00969.

Tony Lindeberg, "Feature Detection with Automatic Scale Selection", International Journal of Computer Vision, 30(2):79-116, 1998. 02047.

Kevin E. Loewke, et al., "Real-time image mosaicing for medical applications", Studies in Health Technology and Informatics, 125, 2007. 00017.

Kevin E. Loewke, et al., "In Vivo Micro-Image Mosaicing", IEEE Transactions on Biomedical Engineering, 58(1):159-171, 2011. 00024.

Manolis I. A. Lourakis, et al., "SBA: A software package for generic sparse bundle adjustment", ACM Transactions on Mathematical Software, 36(1):1-30, 2009. 00497.

David G. Lowe, "Distinctive Image Features from Scale-Invariant Keypoints", International Journal of Computer Vision, 60(2):91-110, 2004. 21859.

David G. Lowe, "Object recognition from local scale-invariant features", In IEEE International Conference on Computer Vision (ICCV), vol. 2, pp. 1150-1157, 1999. 08207.

Xiongbiao Luo et al., "An Application Driven Comparison of Several Feature Extraction Algorithms in Bronchoscope Tracking During Navigated Bronchoscopy", In International Workshop on Medical Imaging and Augmented Reality, pp. 475-484. Springer Berlin Heidelberg, 2010. 00009.

Nader Mahmoud, et al., "Fast 3D Structure From Motion with Missing Points from Registration of Partial Reconstructions", In Francisco J. Perales, Robert B. Fisher, and Thomas B. Moeslund, editors, International Conference on Articulated Motion and Deformable Objects, Lecture Notes in Computer Science, pp. 173-183. Springer Berlin Heidelberg, 2012.

L. Maier-Hein, et al., "Optical Techniques for 3D Surface Reconstruction in Computer-assisted laparoscopic surgery", Medical Image Analysis, 17(8):974-996, 2013. 00079.

(56) References Cited

OTHER PUBLICATIONS

Abed Malti, et al., "Template-Based Conformal Shape-from-Motion-and-Shading for Laparoscopy", In International Conference on Information Processing in Computer-Assisted Interventions (IPCAI), pp. 1-10. Springer, 2012.
John C. Mankins, "Technology readiness levels", NASA White Paper, 1995.
D. Marr, et al., "Theory of Edge Detection", Proceedings of the Royal Society of London. Series B. Biological Sciences, 207(1167):187-217, 1980. 06135.
Rui Melo, et al., "A New Solution for Camera Calibration and Real-Time Image Distortion Correction in Medical Endoscopy—Initial Technical Evaluation", IEEE Transactions on Biomedical Engineering, 59(3):634-644, 2012. 00000.
Krystian Mikolajczyk, et al., "A Performance Evaluation of Local Descriptors", IEEE Transactions on Pattern Analysis and Machine Intelligence, 27(10):1615-1630, 2005. 05438.
K. Mikolajczyk, et al., "A Comparison of Affine Region Detectors", International Journal of Computer Vision, 65(1-2):43-72, 2005. 02193.
Krystian Mikolajczyk, "Detection of local features invariant to affine transformations", PhD thesis, Institut National Polytechnique de Grenoble—INPG, 2002. 00176.
Ondreje Miksik, et al., "Evaluation of Local Detectors and Descriptors for Fast Feature Matching", In International Conference on Pattern Recognition (ICPR), pp. 2681-2684, 2012. 00028.
Rosebet Miranda-Luna, et al., "Mosaicing of Bladder Endoscopic Image Sequences: Distortion Calibration and Registration Algorithm", IEEE Transactions on Biomedical Engineering, 55(2):541-553, 2008. 00053.
R. Miranda-Luna, et al., "Mosaicing of medical video-endoscopic images: data quality improvement and algorithm testing", In International Conference on Electrical and Electronics Engineering (ICEEE), pp. 530-535, 2004. 00011.
Daniel Mirota, et al., "Toward video-based navigation for endoscopic endonasal skull base surgery", In International Conference on Medical Image Computing and Computer-Assisted Intervention (MICCAI), vol. 12, pp. 91-99, 2009. 00018.
Daniel J. Mirota, et al., "A System for Video-Based Navigation for Endoscopic Endonasal Skull Base Surgery", IEEE Transactions on Medical Imaging, 31(4):963-976, 2012. 00009.
Peter Mountney, et al., "Dynamic view expansion for minimally invasive surgery using simultaneous localization and mapping", In IEEE International Conference of the Engineering in Medicine and Biology Society (EMBC), pp. 1184-1187, 2009. 00017.
Peter Mountney, et al., "Context specific descriptors for tracking deforming tissue", Medical Image Analysis, 16(3):550-561, 2011. 00000.
E. Mouragnon, et al., "Generic and real-time structure from motion using local bundle adjustment", Image and Vision Computing, 27(8):1178-1193, 2009.
Alexander Neubeck, et al., "Efficient Non-Maximum Suppression", In International Conference on Pattern Recognition (ICPR), vol. 3, pp. 850-855, 2006. 00075.
Richard A. Newcombe, et al., "DTAM: Dense tracking and mapping in real-time", In IEEE International Conference on Computer Vision (ICCV), pp. 2320-2327, 2011. 00410.
Jorge Nocedal, et al., "Numerical Optimization", Springer series in operation research and financial engineering. Springer, New York, NY, 2 edition, 2006. 17109.
Mang Ou-Yang, et al., "Image stitching and image reconstruction of intestines captured using radial imaging capsule endoscope", Optical Engineering, 51(5):057004-1-057004-9, 2012. 00001.
Mustafa Özuysal, et al., "Fast Keypoint Recognition Using Random Ferns", IEEE Transactions on Pattern Analysis and Machine Intelligence, 32(3):448-461, 2010.
Soo-Chang Pei, et al., "Design of FIR bilevel Laplacian-of-Gaussian filter", Signal Processing, 82(4):677-691, 2002. 00015.
Hanchuan Peng, et al., "Feature selection based on mutual information: criteria of max-dependency, max-relevance, and min-redundancy", IEEE Transactions on Pattern Analysis and Machine Intelligence, 27(8):1226-1238, 2005. 02738.
Tuan Q Pham, "Non-maximum suppression using fewer than two comparisons per pixel", In International Conference on Advanced Concepts for Intelligent Vision Systems (ACIVS), pp. 438-451. Springer Berlin Heidelberg, 2010. 00009.
Thien Phan, et al., "Performance-analysis-based acceleration of image quality assessment", In IEEE Southwest Symposium on Image Analysis and Interpretation (SSIAI), pp. 81-84, Apr. 2012.
Fatih Porikli, "Integral Histogram: A Fast Way to Extract Histograms in Cartesian Spaces", In IEEE Computer Society Conference on Computer Vision and Pattern Recognition (CVPR), vol. 1, pp. 829-836, 2005. 00598.
V. B. Surya Prasath, et al., "Mucosal region detection and 3D reconstruction in wireless capsule endoscopy videos using active contours", In IEEE International Conference of the Engineering in Medicine and Biology Society (EMBC), pp. 4014-4017, 2012. 00004.
Victor Adrian Prisacariu, et al., "Real-Time 3D Tracking and Reconstruction on Mobile Phones", IEEE Transactions on Visualization and Computer Graphics, 21(5):557-570, 2015. 00001.
Ramesh Raskar, et al., "Quadric Transfer for Immersive Curved Screen Displays", Computer Graphics Forum, 23(3):451-460, 2004.
Ramesh Raskar, et al., "iLamps: Geometrically Aware and Self-Configuring Projectors", In International Conference on Computer Graphics and Interactive Techniques (SIGGRAPH), SIGGRAPH '06, New York, NY, USA, 2006. ACM. 00413.
James C. Reynolds, "Innovative Endoscopic Mapping Technique of Barrett's Mucosa", The American Journal of Medicine, 111(8, Suppl. 1):142-146, 2001. 00003.
Rogério Richa, et al., "Hybrid tracking and mosaicking for information augmentation in retinal surgery", In International Conference on Medical Image Computing and Computer-Assisted Intervention (MICCAI), pp. 397-404. Springer Berlin Heidelberg, 2012. 00001.
Sebastian Röhl, et al., "Dense GPU-enhanced surface reconstruction from stereo endoscopic images for intraoperative registration", Medical Physics, 39(3):1632-1645, 2012. 00021.
Lars H. Rohwedder, "Transversal stereographic projection with extreme extent", 2006. 00000.
Paul L. Rosin, "Measuring Corner Properties", Computer Vision and Image Understanding, 73(2):291-307, 1999.
Edward Rosten, et al., "Fusing points and lines for high performance tracking", In IEEE International Conference on Computer Vision (ICCV), vol. 2, pp. 1508-1515, 2005. 00545.
Edward Rosten, et al., "Machine Learning for High-Speed Corner Detection", In Ales Leonardis, Horst Bischof, and Axel Pinz, editors, European Conference on Computer Vision (ECCV), Lecture Notes in Computer Science, pp. 430-443. Springer Berlin Heidelberg, 2006. 01320.
Edward Rosten, et al., "Faster and Better: A Machine Learning Approach to Corner Detection", IEEE Transactions on Pattern Analysis and Machine Intelligence, 32(1):105-119, 2010. 00422.
B. Rousso, et al., "Universal mosaicing using pipe projection", In IEEE International Conference on Computer Vision (ICCV), pp. 945-950, 1998. 00082.
Ethan Rublee, et al., "ORB: An efficient alternative to SIFT or SURF", In IEEE International Conference on Computer Vision (ICCV), pp. 2564-2571, 2011. 00644.
Cordelia Schmid, et al., "Comparing and evaluating interest points", In IEEE International Conference on Computer Vision (ICCV), pp. 230-235, 1998.
Eric J. Seibel, et al., "Tethered Capsule Endoscopy, A Low-Cost and High-Performance Alternative Technology for the Screening of Esophageal Cancer and Barrett's Esophagus", IEEE Transactions on Biomedical Engineering, 55(3):1032-1042, 2008. 00043.
Sharmishtaa Seshamani, et al., "Real-time endoscopic mosaicking", In International Conference on Medical Image Computing and Computer-Assisted Intervention (MICCAI), pp. 355-363. Springer Berlin Heidelberg, 2006. 00039.
Albert O. Shar, et al., "Computer Enhanced Endoscopic Visualization", In Symposium on Computer Applications in Medical Care (SCAMC), pp. 544-546, 1990.

(56) References Cited

OTHER PUBLICATIONS

Amnon Shashua, "Q-warping: Direct computation of quadratic reference surfaces", IEEE Transactions on Pattern Analysis and Machine Intelligence, 23(8):920-925, 2001. 00012.

Amnon Shashua, et al., "The Quadric Reference Surface: Theory and Applications", International Journal of Computer Vision, 23(2):185-198, 1997. 00053.

Heung-Yeung Shum, et al., "Construction of Panoramic Image Mosaics with Global and Local Alignment", In Panoramic Vision, Monographs in Computer Science, pp. 227-268. Springer New York, 2001. 00016.

Rob Siliciano, "Constructing Mobius Transformations with Spheres", Rose-Hulman Undergraduate Mathematics Journal, 13(2):114-124, 2012. 00000.

Noah Snavely, et al., "Modeling the World from Internet Photo Collections", International Journal of Computer Vision, 80(2):189-210, 2007. 00000.

Timothy D. Soper, et al., "Surface Mosaics of the Bladder Reconstructed From Endoscopic Video for Automated Surveillance", IEEE Transactions on Biomedical Engineering, vol. 59, No. 6, Jun. 2012.

Timothy D. Soper, et al., "Constructing spherical panoramas of a bladder phantom from endoscopic video using bundle adjustment", In International Society for Optics and Photonics (SPIE), vol. 7964, pp. 796417-796417-12, 2011. 00008.

S. Speidel, et al., "Robust feature tracking for endoscopic pose estimation and structure recovery", In International Society for Optics and Photonics (SPIE), pp. 867102-867102-7, 2013. 00000.

Evaggelos Spyrou, et al., "Panoramic Visual Summaries for Efficient Reading of Capsule Endoscopy Videos", In International Workshop on Semantic and Social Media Adaptation and Personalization (SMAP), pp. 41-46, 2013.

Thomas Stehle, et al., "Camera calibration for fish-eye lenses in endoscopy with an application to 3D reconstruction", In IEEE International Symposium on Biomedical Imaging: From Nano to Macro (ISBI), pp. 1176-1179, 2007. 00014.

Danail Stoyanov, et al., "Laparoscope Self-calibration for Robotic Assisted Minimally Invasive Surgery", In James S. Duncan and Guido Gerig, editors, International Conference on Medical Image Computing and Computer-Assisted Intervention (MICCAI), Lecture Notes in Computer Science, pp. 114-121. Springer Berlin Heidelberg, 2005. 00014.

Danail Stoyanov, et al., "Real-Time Stereo Reconstruction in Robotically Assisted Minimally Invasive Surgery", In Tianzi Jiang, Nassir Navab, Josien P. W. Pluim, and Max A. Viergever, editors, International Conference on Medical Image Computing and Computer-Assisted Intervention (MICCAI), Lecture Notes in Computer Science, pp. 275-282. Springer Berlin Heidelberg, 2010. 00052.

Bo Sun, et al., "3D Reconstruction Based on Capsule Endoscopy Image Sequences", In International Conference on Audio Language and Image Processing (ICALIP), pp. 607-612, 2010. 00002.

Richard Szeliski, "Image Alignment and Stitching: A Tutorial", Foundations and Trends in Computer Graphics and Vision, 2(1):1-104, 2006. 00744.

Richard Szeliski, "Computer Vision: Algorithms and Applications", Springer-Verlag New York, 1 edition, 2010. 01093.

Richard Szeliski, et al., "Creating Full View Panoramic Image Mosaics and Environment Maps", In International Conference on Computer Graphics and Interactive Techniques (SIGGRAPH), pp. 251-258, 1997. 01026.

Ernesto Tapia, "A note on the computation of high-dimensional integral images", Pattern Recognition Letters, 32(2):197-201, 2011.

Thorsten Thormählen, et al., "Three-Dimensional Endoscopy", In Falk Symposium No. 124, Medical Imaging in Gastroenterology and Hepatology. Kluwer Academic, 2002.

Ben Tordoff, et al., "Guided Sampling and Consensus for Motion Estimation", In Anders Heyden, Gunnar Sparr, Mads Nielsen, and Peter Johansen, editors, European Conference on Computer Vision (ECCV), Lecture Notes in Computer Science, pp. 82-96. Springer Berlin Heidelberg, 2002. 00166.

P.H.S. Torr et al., "MLESAC: A New Robust Estimator with Application to Estimating Image Geometry", Computer Vision and Image Understanding, 78(1):138-156, 2000.

Johannes Totz, et al., "Enhanced visualisation for minimally invasive surgery", International Journal for Computer Assisted Radiology and Surgery, 7(3):423-432, 2011. 00000.

Johannes Totz, et al., "Dense Surface Reconstruction for Enhanced Navigation in MIS", In Gabor Fichtinger, Anne Martel, and Terry Peters, editors, International Conference on Medical Image Computing and Computer-Assisted Intervention (MICCAI), Lecture Notes in Computer Science, pp. 89-96. Springer Berlin Heidelberg, 2011. 00022.

Bill Triggs, et al., "Bundle Adjustment—A Modern Synthesis", In Bill Triggs, Andrew Zisserman, and Richard Szeliski, editors, International Workshop on Vision Algorithms: Theory and Practice, Lecture Notes in Computer Science, pp. 298-372. Springer Berlin Heidelberg, 2000. 01883.

Leonardo Trujillo, et al., "Automated Design of Image Operators that Detect Interest Points", Evolutionary Computation, 16(4):483-507, 2008. 00070.

Roger Y. Tsai, "A versatile camera calibration technique for high-accuracy 3D machine vision metrology using off-the-shelf TV cameras and lenses", IEEE Journal of Robotics and Automation, 3(4):323-344, 1987. 05559.

Cancer Research UK, "Diagram showing a cystoscopy for a man and a woman", Jul. 2014. 00000.

Cancer Research UK, "Diagram showing the layers of the bladder", Jul. 2014. 00000.

Tom Vercauteren, "Image registration and mosaicing for dynamic In vivo fibered confocal microscopy", PhD thesis, Ecole Nationale Superieure des Mines de Paris, Computer Science, Paris, 2008. 00010.

Tom Vercauteren, et al., "Real time autonomous video image registration for endomicroscopy: fighting the compromises", In International Society for Optics and Photonics (SPIE), vol. 6861, pp. 68610C-68610C-8, 2008. 00016.

Tom Vercauteren, et al., "Robust mosaicing with correction of motion distortions and tissue deformations for in vivo fibered microscopy", Medical Image Analysis, 10(5):673-692, 2006.

Paul Viola, et al., "Rapid object detection using a boosted cascade of simple features", In IEEE Computer Society Conference on Computer Vision and Pattern Recognition (CVPR), vol. 1, pp. 511-518, 2001. 09788.

Alexander Warren, et al., "Horizon Stabilized-Dynamic View Expansion for Robotic Assisted Surgery (HS-DVE)", International Journal for Computer Assisted Radiology and Surgery, 7(2):281-288, 2011. 00000.

Lifang Wei, et al., "The Retinal Image Mosaic Based on Invariant Feature and Hierachical Transformation Models", In International Congress on Image and Signal Processing (CISP), pp. 1-5, 2009.

Thomas Weibel, et al., "Contrast-enhancing seam detection and blending using graph cuts", In International Conference on Pattern Recognition (ICPR), pp. 2732-2735, 2012. 00002.

Thomas Weibel, et al., "Endoscopic bladder image registration using sparse graph cuts", In IEEE International Conference on Image Processing (ICIP), pp. 157-160, 2010. 00009.

Thomas Weibel, "Modèles de minimisation d'énergies discrètes pour la cartographie cystoscopique", PhD thesis, Universite de Lorraine, IAEM—Ecole Doctorale Informatique, Automatique, Electronique—Electrotechnique, Math ematiques, Lorraine, 2013. 00000.

Thomas Weibel, et al., "Graph based construction of textured large field of view mosaics for bladder cancer diagnosis", Pattern Recognition, 45(12):4138-4150, 2012. 00005.

Christian Wengert, et al., "Fully Automatic Endoscope Calibration for Intraoperative Use", In Bildverarbeitung für die Medizin (BVM), pp. 419-23. Springer Berlin Heidelberg, 2006. 00036.

Brian Williams, et al., "A comparison of loop closing techniques in monocular SLAM", Robotics and Autonomous Systems, 57(12):1188-1197, 2009. 00066.

Andrew P. Witkin, "Scale-Space Filtering", In International Joint Conference on Artificial Intelligence (IJCAI), pp. 1019-1022. Morgan Kaufmann Publishers Inc., 1983. 00002.

(56) References Cited

OTHER PUBLICATIONS

Andrew P. Witkin, "Scale-Space Filtering: A new approach to multi-scale description", In IEEE International Conference on Acoustics, Speech, and Signal Processing (ICASSP), vol. 9, pp. 150-153, 1984. 03515.
Thomas Wittenberg, "Endoskopie", In Olaf Dössel and Thorsten M. Buzug, editors, Medizinische Bildgebung, vol. 7 of Biomedizinische Technik. De Gruyter, Berlin Boston, 2014. 00000.
Thomas Wittenberg, et al., "3-D Reconstruction of the Sphenoidal Sinus from Monocular Endoscopic Views: First results", In Jahrestagung der Deutschen, Österreichischen und Schweizerischen Gesellschaften f ur Biomedizinische Technik (DGBMT), 2006. 00000.
Wayne Wolf, "Key frame selection by motion analysis", In IEEE International Conference on Acoustics, Speech, and Signal Processing (ICASSP), vol. 2, pp. 1228-1231, 1996. 00473.
Chenying Yang, et al., "Detecting fluorescence hot-spots using mosaic maps generated from multimodal endoscope imaging", In International Society for Optics and Photonics (SPIE), vol. 8575, pp. 857508-857508-11, 2013. 00001.
Steven Yi, et al., "Achieving real-time capsule endoscopy (CE) video visualization through panoramic imaging", In International Society for Optics and Photonics (SPIE), vol. 8656, pp. 86560I-86560I-7, 2013. 00000.
Jong Yoon, et al., "Development of an Automated Steering Mechanism for Bladder Urothelium Surveillance", Journal of Medical Devices, 3(1):11004, 2009.
Julio Zaragoza, et al., "As-Projective-As- Possible Image Stitching with Moving DLT", IEEE Transactions on Pattern Analysis and Machine Intelligence, 36(7):1285-1298, 2014. 00023.
Chao Zhang, et al., "Nonlinear distortion correction in endoscopic video images", In IEEE International Conference on Image Processing (ICIP), vol. 2, pp. 439-442, 2000. 00031.
Zhengyou Zhang, "A Flexible New Technique for Camera Calibration", IEEE Transactions on Pattern Analysis and Machine Intelligence, 22(11):1330-1334, 2000. 05843.
Qian Zhao, et al., "3D Reconstruction of GI Tract Texture Surface Using Capsule Endoscopy Images", In IEEE International Conference on Automation and Logistics (ICAL), pp. 277-282, 2012. 00000.
Barbara Zitová, et al., "Image registration methods: a survey", Image and Vision Computing, 21(11):977-1000, 2003. 00000.
Pradip Mainali, et al., "Robust Low Complexity Corner Detector", IEEE Transactions on Circuits and Systems for Video Technology, IEEE Service Center US, vol. 21, No. 4, Apr. 1, 2011, pp. 435-445, XP011480285.
Scott Krig, "Interest Point Detector and Feature Descriptor Survey", computer Vision Metrics, May 2014, XP055241490.
Seer Training Module National Cancer Institute. Illu quiz bladder; 1 page; retrieved Oct. 17, 2019; and Seer Training link: https://training.seer.cancer.gov/index.html, Oct. 17, 2019.
Tatsuo Igarashi, Satoki Zenbutsu, Tomonori Yamanishi, and Yukio Naya. Three-Dimensional Image Processing System for the Ureter and Urethra Using Endoscopic Video. Journal of Endourology, 22(8):1569-1572, 2008, 2008.
Rüdiger Kramme, editor. Medizintechnik. Springer Berlin Heidelberg; 1044 pages; 2011, 2011.
W. J. Yoon, M.A. Brown, P.G.Reinhall, S.Park, and E.J. Seibel. Design and preliminary study of custom laser scanning cystoscope for automated bladder surveillance. Minimally Invasive Therapy and Allied Technologies, 21(5):320-328, 2012, 2012.
Alexander Behrens. Verfahren zur Visualisierung and Navigation in der Fluoreszenzenendoskopie. PhD thesis, Sierke, Göttingen, 2013., 2013.
Maxine Sun and Quoc-Dien Trinh. Diagnosis and staging of bladder cancer. Hematology/Oncology Clinics of North America, 29(2):205-218, 2015, 2015.
Ishii, Takuro, et al., Novel Points of View for Endoscopy: Panoramized Intraluminal Opened Image and 3d Shape Reconstruction. Journal of Medical Imaging and Health Informatics, 1(1):13-20, 2011., 2011.

* cited by examiner step i) 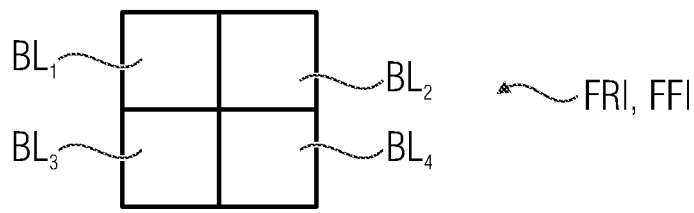
step ii) 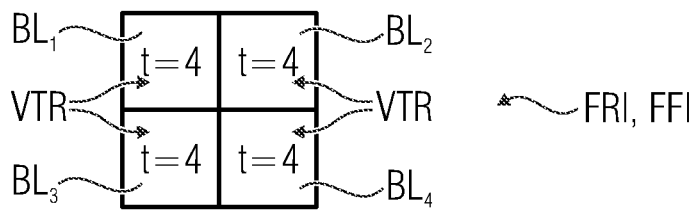
step iii) 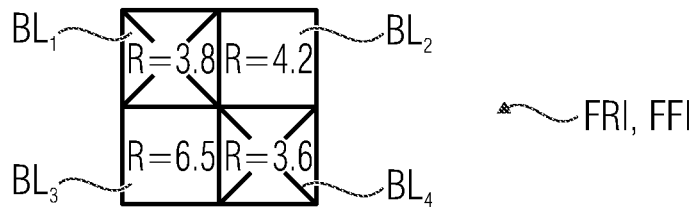
step iv) $CTR \longrightarrow T = 6, R > T ? \Rightarrow BL_3$
step v) 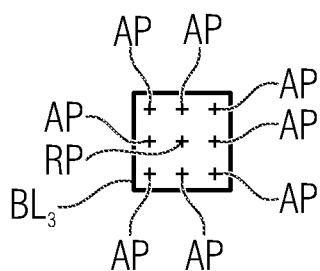
step vi) 
step vii) execute steps ii) to vi) for
$BL_{21}, BL_{22}, BL_{23}, BL_{24}, BL_{31}, BL_{32}, BL_{33}, BL_{34}$
Fig. 2

IMAGE PROCESSING DEVICE AND METHOD FOR PRODUCING IN REAL-TIME A DIGITAL COMPOSITE IMAGE FROM A SEQUENCE OF DIGITAL IMAGES

CROSS-REFERENCES TO RELATED APPLICATIONS

This application is a continuation of copending International Application No. PCT/EP2016/079324, filed Nov. 30, 2016, which is incorporated herein by reference in its entirety.

The present invention relates to digital image processing. More specific, the invention relates to real-time image stitching. Digital image stitching is the process of combining multiple photographic images with overlapping fields of view to produce a segmented panorama or high-resolution composite image.

BACKGROUND OF THE INVENTION

Image stitching is widely used in today's world in applications such as "Image Stabilization" feature in camcorders which use frame-rate image alignment, high resolution photo mosaics in digital maps and satellite photos, multiple image super-resolution, video stitching, object insertion and medical imaging such as microscopy or endoscopy.

The present invention may be useful in all applications mentioned above. However, the main applications of the invention may be seen in the field of medical endoscopy as the techniques involved may use a high degree of orientation, coordination, and fine motor skills on the part of the medical practitioner, due to the very limited field of view provided by the endoscope and the lack of relation between the orientation of the image and the physical environment.

SUMMARY

According to an embodiment, an image processing device for producing in real-time a digital composite image from a sequence of digital images recorded by a camera device, in particular an endoscopic camera device, so that the composite image has a wider field of view than the images of the sequence of images may have: a selecting unit configured for selecting a reference image and a further image from the sequence of images, wherein the reference image is specified in a global coordinate system of the composite image, wherein the further image is specified in a local coordinate system of the further image, and wherein the further image is overlapping the reference image; a key point detection unit configured for detecting one or more global key points in the reference image and for detecting one or more local key points in the further image, wherein the key point detection unit includes a smoothing filter configured for producing a filter response for the reference image and for producing a filter response for the further image, wherein the key point detection unit includes a maximum detection unit configured for detecting the one or more global key points by detecting local maxima in the filter response for the reference image and for detecting the one or more local key points by detecting local maxima in the filter response for the further image by executing following steps separately for the filter response for the reference image and for the filter response for the further image, wherein a variable threshold is used: i) creating blocks by dividing the respective filter response, ii) calculating the variable threshold, iii) discarding those blocks of the blocks from further consideration, in which the respective filter response at a reference point of the respective block is less than the respective variable threshold; a transforming unit configured for transforming the further image into the global coordinate system based on at least one of the one or more global key points and based on at least one of the one or more local key points in order to produce a transformed further image; and a joining unit configured for joining the reference image and the transformed further image in the global coordinate system in order to produce at least a part of the composite image; wherein the maximum detection unit is configured for executing following steps each time after executing step iii), wherein a constant threshold is used: iv) determining those blocks from the blocks not being discarded in step iii), in which the respective filter response at the reference point of the respective block exceeds the constant threshold, v) comparing for the determined blocks the respective filter response at the reference point with the respective filter response at points adjacent to the reference point in order to determine whether one of the local maxima is detected at the reference point; and wherein the maximum detection unit is configured for calculating the variable threshold in step ii) as a function of a dimension of the blocks, a size of the smoothing filter, the constant threshold and a steering parameter for adjusting between a high detection rate and a short computation time.

According to another embodiment, a camera system for producing in real-time a digital composite image may have: a camera device configured for recording a sequence of digital images, in particular an endoscopic camera device configured for recording a sequence of digital images of an interior of a hollow structure; and an inventive image processing device.

According to another embodiment, a method for producing in real-time a digital composite image from a sequence of digital images recorded by a camera device, in particular by an endoscopic camera device, so that the composite image has a wider field of view than the images of the sequence of images may have the steps of: selecting a reference image and a further image from the sequence of images by using a selecting unit, wherein the reference image is specified in a global coordinate system of the composite image, wherein the further image is specified in a local coordinate system of the further image, and wherein the further image is overlapping the reference image; detecting one or more global key points in the reference image and detecting one or more local key points in the further image by using a key point detection unit; wherein a filter response for the reference image and a filter response for the further image are produced by using a smoothing filter of the key point detection unit, wherein the one or more global key points are detected by detecting local maxima in the filter response for the reference image and the one or more local key points are detected by detecting local maxima in the filter response for the further image by executing steps i) to iii) separately for the filter response for the reference image and for the filter response for the further image by using a maximum detection unit of the key point detection unit, wherein a variable threshold is used, wherein the steps i) to iii) are defined as: i) creating blocks by dividing the respective filter response, ii) calculating the variable threshold, iii) discarding those blocks of the blocks from further consideration, in which the respective filter response at a reference point of the respective block is less than the respective variable threshold; transforming the further image into the global coordinate system by using a transforming unit based on at least one of the one or more global key points and based on at least one of the one or more local key points in order to produce a transformed further image; joining the reference image and the transformed further image in the global coordinate system by using a joining unit in order to produce at least a part of the composite image; and executing following steps each time after executing step iii) by using the maximum detection unit, wherein a constant threshold is used: iv) determining those blocks from the blocks not being discarded in step iii), in which the respective filter response at the reference point of the respective block exceeds the constant threshold, v) comparing for the determined blocks the respective filter response at the reference point with the respective filter response at points adjacent to the reference point in order to determine whether one of the local maxima is detected at the reference point; wherein the maximum detection unit is configured for calculating the variable threshold in step ii) as a function of a dimension of the blocks, a size of the smoothing filter, the constant threshold and a steering parameter for adjusting between a high detection rate and a short computation time.

Another embodiment may have a non-transitory digital storage medium having a computer program stored thereon to perform the method for producing in real-time a digital composite image from a sequence of digital images recorded by a camera device, in particular by an endoscopic camera device, so that the composite image has a wider field of view than the images of the sequence of images, the method including: selecting a reference image and a further image from the sequence of images by using a selecting unit, wherein the reference image is specified in a global coordinate system of the composite image, wherein the further image is specified in a local coordinate system of the further image, and wherein the further image is overlapping the reference image; detecting one or more global key points in the reference image and detecting one or more local key points in the further image by using a key point detection unit; wherein a filter response for the reference image and a filter response for the further image are produced by using a smoothing filter of the key point detection unit, wherein the one or more global key points are detected by detecting local maxima in the filter response for the reference image and the one or more local key points are detected by detecting local maxima in the filter response for the further image by executing steps i) to iii) separately for the filter response for the reference image and for the filter response for the further image by using a maximum detection unit of the key point detection unit, wherein a variable threshold is used, wherein the steps i) to iii) are defined as: i) creating blocks by dividing the respective filter response, ii) calculating the variable threshold, iii) discarding those blocks of the blocks from further consideration, in which the respective filter response at a reference point of the respective block is less than the respective variable threshold; transforming the further image into the global coordinate system by using a transforming unit based on at least one of the one or more global key points and based on at least one of the one or more local key points in order to produce a transformed further image; joining the reference image and the transformed further image in the global coordinate system by using a joining unit in order to produce at least a part of the composite image; and executing following steps each time after executing step iii) by using the maximum detection unit, wherein a constant threshold is used: iv) determining those blocks from the blocks not being discarded in step iii), in which the respective filter response at the reference point of the respective block exceeds the constant threshold, v) comparing for the determined blocks the respective filter response at the reference point with the respective filter response at points adjacent to the reference point in order to determine whether one of the local maxima is detected at the reference point; wherein the maximum detection unit is configured for calculating the variable threshold in step ii) as a function of a dimension of the blocks, a size of the smoothing filter, the constant threshold and a steering parameter for adjusting between a high detection rate and a short computation time, when said computer program is run by a computer.

The term "real-time" has to be understood in such way that each of the further images is added to the composite image in less than a second.

Image registration is one of the crucial steps for image mosaicking. Registration of a sequence of images refers to the process of aligning all images in a common coordinate system, i.e. finding the transformation for each image to transform its image coordinates to a global coordinate system. The image processing device is configured for pair-wise image registration. The pixel coordinates of a reference image $I^F$ define the global coordinate system, while the image to be transformed is referred to as the further image $I^M$. A transformation $T:I^M1 \rightarrow I^F$ maps the pixel coordinates of the further image, which are given in the local coordinate system of the further image, to the global coordinate system defined by the fixed image.

The inventive image processing device uses a feature-based registration algorithm, which extracts salient key points from both images $I^F$ and $I^M$ to identify a set of corresponding points between them. A feature is a higher level description of a regional neighborhood of a key point from an image, which distinctively characterizes that regional neighborhood and can be matched to the corresponding feature from another image. Usually, the process of establishing a set of corresponding features involves three distinctive steps: key point detection, feature description, and descriptor matching. Key point detection extracts salient image points referred to as key points. Ideally, the same set of key points should be detected when applied to different image views of the same object or scene.

A key point consists of the two-dimensional pixel position within an image, optionally augmented by further characteristics, such as scale or orientation of the regional neighborhood. Given a set of key points, feature descriptors need to be calculated to characterize each key point's local neighborhood. A descriptor is usually represented by a vector of n real, integral, or binary numbers. Ideally, two descriptors calculated from two images showing the same physical object should be equal (or similar in practice). During the matching process, a mapping is generated to identify pairs of corresponding key points, based on their descriptors. An example of a simple matching strategy is one which maps every key point from $I^M$ to its most similar key point from $I^F$, with similar being defined as a small distance between key points in the n-dimensional descriptor vector space [11, 40].

Key points may be extracted from the respective image as local maxima of the filter response. The filter response may be a three-dimensional function R (x, y, s), wherein x and y represent the coordinates of a pixel of the respective image and wherein s represents the scale space.

The final step of key point detection is the extraction of local maxima of the scale-space response volume R. To determine whether a point (x, y, s) is a local maximum, its value R (x, y, s) is compared to all values within a neighborhood region. The point is a local maximum if and only if its value is greater than all its neighbors within that region.

This approach is generally known as non-maximum suppression (NMS). The neighborhood region may be defined as a block of size $n_x \times n_y \times n_s$. The NMS algorithm is decisive for the overall computational performance of the key point detection method, since the comparison of function values R (x, y, s) is a very frequent operation. In prior art implementations every value is compared to its entire neighborhood, leading to a worst-case complexity of O (M·N·S·$n_x$·$n_y$·$n_s$) for an image of size M×N and S=O·L layers. This complexity can be significantly reduced according to the invention by early rejection of comparisons.

Literature explicitly dealing with NMS usually only handles the one- and two-dimensional cases. As early as 1987, Förstner and Gülch showed how to improve the naive implementation, just by altering the order of comparisons from a line-by-line scan order to a spiral scan order [3]. The idea is, that a local maximum in a $(n_x+1) \times (n_y+1)$ neighborhood is also a local maximum of any sub region of this neighborhood. They observed that it is advantageous to search for any pixels of greater value within the central $n_x \times n_y$ neighborhood before moving outwards, leading to the spiral scan order. This idea was further pursued by Neubeck and Van Gool who proposed a block-partitioning algorithm to accelerate NMS for the two-dimensional case [6]. This reduces the average number of comparisons needed for $(n_x \times n_y)$-NMS below 2.39. Pham accomplished to further drop this number below two comparisons per pixel, independent of the neighborhood size [7]. All of the presented algorithms can, in principal, be adapted to the useful three-dimensional case.

It is worth noting that the benefit of these algorithms over the straightforward implementation increases with the neighborhood size. Pham showed that the performance of Förstner's spiral ordering method is comparable to the newer methods up to a neighborhood size of 11×11 pixels. Most feature detectors use a 3×3×3 neighborhood. It can be concluded that the impact of choosing one of the presented NMS schemes has little impact on the detector's computation time. Nevertheless, there is much room for improvement by choosing an appropriate sampling scheme within the scale-space R. Since the density of possible key points decreases at higher scales, most authors follow a pyramidal approach. They start by sampling every pixel at the lowest pyramid level and reduce the sampling rate by a factor of two for every octave. Thus, the number of points (x, y, s) to check for local maxima is reduced exponentially for higher pyramid levels. The obvious disadvantage of this strategy is the increasing risk of missing local maxima or locating them less precisely. Therefore, the maxima are usually quadratically interpolated between the sampling points as a refinement step. Agrawal et al. argue that they achieve a higher accuracy by sampling the entire volume at the full resolution [1]. This becomes feasible due to their implementation of a key point detector as difference-of-boxes.

The image processing device according to the invention is configured for executing a hierarchical local maxima search. The key concept of hierarchical local maxima search is the reduction of sampling points by skipping points which can be assumed to be smaller than a minimum value. The sampling mechanism is based on an octree representation of sampling points in the filter response. Every tree node represents a block within the filter responds and contains its dimensions (m, m, n), a reference point $(x_r, y_r, s_r)$, and a variable threshold (t). First, the entire filter response may be divided into blocks of an initial size $m_0 \times m_0 \times n_0$. Each block may then be divided recursively into eight (sub-)blocks with dimensions $(m_i, m_i, n_i)$, so that every tree node has eight children. During local maxima search the tree is traversed in a depth-first manner. For every traversed block, the filter response R $(x_r, y_r, s_r)$ is evaluated. The result is compared to the variable threshold t. If R $(x_r, y_r, s_r)$<t, it is assumed that all points within the respective block evaluate to a value smaller than a minimum value and can be neglected. Thus, the respective clock may be discarded from further consideration If, on the other hand, R $(x_r, y_r, s_r) \geq t$, points in the respective block may evaluate to values greater than the minimum value. In this case all eight children of the respective block are processed. This strategy quickly traverses blocks of the filter response with low filter responses and effectively reduces the number of function evaluations.

The invention provides an image processing device being configured for executing a new NMS method, which significantly reduces the number of samples within the scale-space without sacrificing for key point localization accuracy, so that the computational effort is lowered significantly.

According to an embodiment of the invention will the maximum detection unit is configured for executing following steps each time after executing step iii), wherein a constant threshold is used:

iv) determining those blocks from the blocks not being discarded in step iii), in which the respective filter response at the reference point of the respective block exceeds the constant threshold, v) comparing for the determined blocks the respective filter response at the reference point with the respective filter response at points adjacent to the reference point in order to determine whether one of the local maxima is detected at the reference point.

Unlike all other NMS approaches, the inventive image processing device may take the value of the filter response R $(x_r, y_r, s_r)$ into account to decide whether neighboring positions need to be processed or not. It can be observed that the filter response is a smooth function, especially for higher scale levels.

If the filter response at a reference point is lower than the constant threshold, the probability that the values of the filter response will exceed the constant threshold in a certain neighborhood is low, as well. Consequently, these positions do not need to be evaluated. The size of this neighborhood depends on the actual value of the filter response at that point and the value of the constant threshold. A sampling scheme based on values of the filter response does not require a fixed sampling pattern, but adapts itself to the image content.

If R $(x_r, y_r, s_r)$ is found to even exceed the constant threshold it is a possible candidate for a local maximum and may be compared to its $n_x \times n_y \times n_s$ neighbors. All local maxima, that exceed the constant threshold, are considered as key points, since a high filter response is associated with a high probability of being a repeatable key point location. The constant threshold is used to adjust the minimum response expected for a key point to be stable and thus influences the number of key points which are detected.

According to an embodiment of the invention the maximum detection unit is configured for executing following steps each time after executing step iii) until a truncation condition occurs:

vi) creating blocks by dividing the blocks not being discarded in step iii), vii) executing of steps ii) to vi) for the blocks created in step vi).

Steps vi) and vii) may be repeated until a truncation condition, in which a block size of one pixel is reached, occurs. That way, the volume is densely sampled around points larger than the variable threshold. Alternatively, the process of block division can be repeated until a truncation condition, in which a block size of more than on pixel (depending on the current scale) is reached, occurs. This incorporates the idea of reducing the sampling density at higher scale levels. The block size of the truncation condition may be defined as $2^{[s/L]}$, wherein s is the scale level and L is the number of levels per octave, i.e. for every octave the block size for the truncation condition is doubled, starting at 1×1×1 for the first octave.

According to an embodiment of the invention the maximum detection unit is configured for dividing the filter response in step i) as a function of a scale level and a number of levels per octave in such way that the blocks all have a same size.

The block size resulting from step i) may be chosen depending on the scale level s. Blocks are larger on higher scale levels, since local maxima are expected to lie farther apart. For the step of dividing the filter response into blocks, the block size may be defined as $m_0=8 \cdot w(s)$, $n_0=2 \cdot L$, wherein w(s) is the filter kernel size at the scale level s and L is the number of levels per octave, covering eight times the filter kernel size and two octaves.

According to an embodiment of the invention the maximum detection unit is configured for creating the blocks in step vi) in such way that the size of the blocks not being discarded in step iii) is divided in halves for all dimensions.

For all steps of dividing the blocks into smaller blocks, the size may be divided by two for all dimensions: $m_i=(m_{i-1})/2$, $n_i=(n_{i-1})/2$.

According to an embodiment of the invention the maximum detection unit is configured for calculating the variable threshold in step ii) as a function of a dimension of the blocks, a size of the filter and the constant threshold.

A crucial part of the hierarchical search strategy is the determination of the variable threshold values $t_i$. These variable thresholds $t_i$ have to be chosen such that an acceptably small number of local maxima are missed. The variable thresholds $t_i$, may depend on the dimension of the block ($m_i$, $m_i$, $n_i$), the filter kernel size w(s) at the current scale level s, the constant threshold T, and a steering parameter $\alpha$ according to:

$$t_i' = T\left(1 - \alpha \frac{m_i}{w(s)}\right), t_i = \begin{cases} t_i' & \text{if } t_i' \geq 0 \\ 0 & \text{else} \end{cases}. \quad (1)$$

The parameter $\alpha$, which is a non-negative real number, may be used to adjust the "sensitivity". For $\alpha=0$, a block is skipped as soon as the filter response is below $t_i=T$. This usually leads to an unacceptably high number of missed local maxima. For higher values of $\alpha$ more blocks are processed, so that less maxima are missed, but processing time increases. Thus, $\alpha$ allows to adjust between high detection rate and short computation time. An appropriate value for a may be determined experimentally.

The following table provides a comparison of local maxima search strategies. The sampling rate is the ratio of samples taken from scale-space. The detection rate is the number of detected key points. Both rates are measured in reference to the full sampling scheme. The processing time per image includes the constant overhead of initialization and integral image calculation, which makes up 7 ms for each algorithm. All measurements are average values over 100 cystoscopic images.

| Sampling | α | sampling rate [%] | Detection rate [%] | Time [ms] |
|---|---|---|---|---|
| Full | | 100.0 | 100.0 | 53.2 |
| Pyramidal | | 18.4 | 90.3 | 17.7 |
| Hierarchical | 0.8 | 9.94 | 85.6 | 21.4 |
| | 1.0 | 13.0 | 97.7 | 23.3 |
| | 1.5 | 18.3 | 99.4 | 25.9 |
| Truncated hierarchical | 0.8 | 4.3 | 77.8 | 11.2 |
| | 1.0 | 6.6 | 88.6 | 12.3 |
| | 1.5 | 10.3 | 90.0 | 13.9 |

According to embodiment of the invention the maximum detection unit is configured for using a central point of the respective block as the reference point of the respective block in step iii). The central point of a block is a point of the block which is closest to the center of the respective block.

According to an embodiment of the invention the key point detection unit comprises an integral image calculator configured for calculating a reference integral image from the reference image and a further integral image from the further image, wherein the filter response for the reference image is produced by feeding the reference integral image to the filter and wherein the filter response for the further image is produced by feeding the further integral image to the filter.

Integral images are also known as summed area tables. An image can be interpreted as the two-dimensional function I (x, y). Then, the integral image $I^\Sigma$ is an intermediate representation of the discrete cumulative distribution function of I:

$$I^\Sigma(x, y) = \sum_{i \leq x \wedge j \leq y} I(i, j). \quad (2)$$

So, every value in $I^\Sigma$ represents the sum of all pixel values of the upper left region of the original image. The sum of any rectangular image area ABCD with $A=(x_0, y_0)$, $B=(x_0, y_1)$, $C=(x_1, y_0)$, $D=(x_1, y_1)$ can be calculated with only four array references in the integral image as $$\sum_{\substack{x_0 < x \leq x_1 \\ y_0 < y \leq y_1}} I(x, y) = I^\Sigma(D) - I^\Sigma(B) - I^\Sigma(C) + I^\Sigma(A). \quad (3)$$

Computation of the integral image can be achieved efficiently in a single pass of the original image as $$I^\Sigma(x, y) = I(x, y) + I^\Sigma(x-1, y) + I^\Sigma(x, y-1) - I^\Sigma(x-1, y-1). \quad (4)$$

An average filter for image smoothing, for example is implemented by calculating the pixel sum within the filter kernel region with equation (3) divided by the number of pixels within this region.

In combination with integral image based filtering, a sampling scheme using the variable threshold and optionally the constant threshold does not only save comparisons between filter response values during NMS, but actually reduces the number of points, at which the filter response has to be calculated. Lowe already suggested reducing the computational load by subsampling the image for every octave [5]. Lindeberg presented a fast automatic scale selection algorithm, which uses a binomial filtering instead of Gaussian smoothing. Both of these suggestions aim at reducing the number of sampling points for which a filter response is calculated. Since integral image based filtering is performed independently for every pixel and every scale level, it optimally qualifies for implementing a selective sampling scheme using the variable threshold and optionally the constant threshold.

According to an embodiment of the invention the filter is configured in such way that each of the filter response for the reference image and the filter response for the further image is equivalent to an absolute difference of two smoothing filter responses of the respective image at different levels of a scale space.

The filter responses at a pixel position (x, y) of image I may be calculated as the absolute differences of two parabolic filter responses at two levels of the scale space. The levels can be defined in terms of the scale level s. s defines the window widths w(s) and w'(s) of the respective smoothing filter kernels $p_{w(s)}$ and $p_{w'(s)}$. The filter response volume R may be calculated as $$\mathcal{R}(x,y,s) = |(I * p_{w(s)})(x,y) - (I * p_{w'(s)})(x,y)|, \quad (5)$$

The scale-space depends on two parameters, the number of octaves O and the number of levels per octave L. The step from one octave to the next is achieved by doubling the filter kernel size. For scale-space key point detectors, common values range from O=4 to 7 for the number of octaves and L=2 to 4 for the number of levels per octave. The functions w(s) and w(s) to determine the filter kernel sizes for scale parameter s∈[L, O·L] may be defined as $$w(s) = 2\lceil 2^{(s+2)/L}\rceil + 1 \quad (6)$$
$$w'(s) = 2\lceil 2^{s/L}\rceil + 1.$$

Choosing O=6, L=2 and rounding the filter sizes to integrals leads to a set of filter kernel sizes {5, 7, 9, 13, 17, 25, 33, 47, 65, 93, 129, 183, 257}.

According to an embodiment of the invention each of the two smoothing filter responses is a parabolic filter response.

According to prior art, integral images have only been applied to box filters (e.g. average filters and Haar wavelets). Witkin introduced the concept of scale-space to represent the inherent structure of a signal on different scales in 1983 [38, 39]. The scale-space of an image may be generated by smoothing the image with a set of filter kernels of increasing size. The kernel size defines the scale parameter s. With increasing scale, more and more image structure is suppressed. Lindeberg identified the Gaussian function to be the only valid smoothing function to generate a linear (Gaussian) scale-space representation. Linear scale-space guarantees that structure is only suppressed and not newly created with increasing scale.

Nonetheless, Gaussian filtering isn't used in practice to create the scale space because it may use a severe amount of computing power and time. Instead, many algorithms are based on approximations to the Gaussian filter kernel to reduce the computational load and increase processing speed. The box filter is one popular approximation, since it can be efficiently calculated using integral images. However, the box filter is not in accordance with the scale-space axioms and results in artifacts in the scale-space representation of the image. Polynomial functions approximate a Gaussian kernel better than box functions, making them more suitable for building a scale-space.

Filtering the image I with a filter kernel k of size (w+1)×(w+1) (w even-numbered) by convolution is defined as $$(I * k)(x, y) = \sum_{u=-w/2}^{w/2} \sum_{v=-w/2}^{w/2} k(u, v) I(x - u, y - v). \quad (7)$$

Substituting i=x−u and j=y−v yields $$(I * k)(x, y) = \sum_{i=x-w/2}^{x+w/2} \sum_{j=y-w/2}^{y+w/2} k(x - i, y - j) I(i, j). \quad (8)$$

For a box filter with kernel $$b = \left(\frac{1}{(w+1)^2}\right)_{(w+1)\times(w+1)} \quad (9)$$

this can be reduced to $$(I * b)(x, y) = \frac{1}{(w+1)^2} \sum_{i=x-w/2}^{x+w/2} \sum_{j=y-w/2}^{y+w/2} I(i, j). \quad (10)$$

The double sum on the right hand side can be evaluated using the integral image of I. This is possible, because b is independent of i and j and can thus be removed from the sum. Let p be a polynomial kernel function of degree n:

$$p(x, y) = \sum_{\substack{r=0 \\ s=0}}^{r+s \leq n} a_{rs} x^r y^s. \quad (11)$$

Following (8) and introducing the short notation for the double sum $$\Sigma_{i=x-w/2}^{x+w/2} \Sigma_{j=y-w/2}^{y+w/2},$$

the respective filter operation is $$(I * p)(x, y) = \sum_{i,j} p(x - i, y - j) I(i, j) \quad (12)$$
$$= \sum_{i,j} \left( \sum_{\substack{r=0 \\ s=0}}^{r+s \leq n} a_{rs} (x - i)^r (y - j)^s \right) I(i, j)$$
$$= \sum_{i,j} \sum_{\substack{r=0 \\ s=0}}^{r+s \leq n} a_{rs} (x - i)^r (y - j)^s I(i, j).$$

Applying the binomial theorem $$(x - i)^r (y - j)^s = \sum_{f=0}^{r} \binom{r}{f} x^{r-f} (-i)^f \sum_{g=0}^{s} \binom{s}{g} y^{s-g} (-j)^g \quad (13)$$

and the distributive law yields $$(I*p)(x,y) = \sum_{i,j} \sum_{\substack{r+s \le n \\ r=0 \\ s=0}} \sum_{\substack{f \le r \\ f=0 \\ g=0}}^{g \le s} a_{rs} \binom{r}{f} x^{r-f}(-i)^f \binom{s}{g} y^{s-g}(-j)^g I(i,j) \quad (14)$$

$$= \sum_{\substack{r+s \le n \\ r=0 \\ s=0}} \sum_{\substack{f \le r \\ f=0 \\ g=0}}^{g \le s} a_{rs} \binom{r}{f} x^{r-f} \binom{s}{g} y^{s-g} \sum_{i,j} (-i)^f (-j)^g I(i,j).$$

Shifting the bounds of summation accordingly, the order of summation is interchanged:

$$(I*p)(x,y) = \sum_{\substack{f+g \le n \\ f=0 \\ g=0}} \sum_{\substack{r+s \le n \\ r=f \\ s=g}} a_{rs} \binom{r}{f} x^{r-f} \binom{s}{g} y^{s-g} \sum_{i,j} (-i)^f (-j)^g I(i,j), \quad (15)$$

leading to a compact formulation of the polynomial filter equation:

$$(I*p)(x,y) = \sum_{f=0, g=0}^{f+g \le n} \xi_{fg}(x,y) \sum_{i=x-w/2}^{x+w/2} \sum_{j=y-w/2}^{y+w/2} i^f j^g I(i,j), \quad (16)$$

where the coefficients are calculated as $$\xi_{fg}(x,y) = \sum_{\substack{r+s \le n \\ r=f \\ s=g}} (-1)^{f+g} a_{rs} \binom{r}{f} x^{r-f} \binom{s}{g} y^{s-g}. \quad (17)$$

Since the inner summands in (16) are independent of x and y, the inner double sum can be pre-calculated to accelerate the computation of the filter response. Let $I_{fg}^\Sigma$ be defined as $$I_{fg}^\Sigma(x,y) = \sum_{i \le x \wedge j \le y} i^f j^g I(i,j). \quad (18)$$

Then, $I_{00}^\Sigma$ is equivalent to the conventional integral image $I^\Sigma$ for implementing a box filter. All integral images $I_{fg}^\Sigma$ with $f \ge 0$, $f \ge 0$, $f+g \le n$ are needed to implement a polynomial filter of order n, resulting in $$\binom{n+2}{2} = \frac{(n+1)(n+2)}{2} \quad (19)$$

integral images. Evaluating the sum over a rectangular region can be achieved with four array references (and three summations). Let us define a compact notation for one such evaluation as $$A_{fg}(x,y) = I_{fg}^\Sigma(D) - I_{fg}^\Sigma(B) - I_{fg}^\Sigma(C) + I_{fg}^\Sigma(A) \quad (20)$$

with ABCD the image region covered by the filter mask around (x; y), so $$A = (x-w/2, y-w/2),$$
$$B = (x-w/2, y+w/2),$$
$$C = (x+w/2, y-w/2),$$
$$D = (x+w/2, y+w/2). \quad (21)$$

Then (16) can be written as $$(I*p)(x,y) = \sum_{f=0, g=0}^{f+g \le n} \xi_{fg}(x,y) \mathcal{A}_{fg}(x,y). \quad (21)$$

A total of $$4 \cdot \binom{n+2}{2} = 2(n+1)(n+2) \quad (22)$$

access operations may be used to evaluate the filter response in one point (independent of the window size). Consider for example the implementation of a filter kernel based on a quadratic function (n=2). Then, six integral images have to be pre-calculated and 24 array references may be used to evaluate the filter response in one point. This will be further considered below, where this theory is used to design a paraboloid filter to approximate a two-dimensional Gaussian smoothing filter. Computation of the images $I_{fg}^\Sigma$ is straight forward. E.g., image $I_{12}^\Sigma$ iteratively computed as $$I_{12}^\Sigma(x,y) = xy^2 I(x,y) + I_{12}^\Sigma(x-1,y) + I_{12}^\Sigma(x,y-1) - I_{12}^\Sigma(x-1,y-1). \quad (23)$$

All integral images are calculated in one single pass over the source image.

The paraboloid filter kernel p(x, y) may be modeled by the quadratic function $$p(x,y) = -a(x^2 + y^2) + b. \quad (24)$$

The filter response may be calculated as $$(I*p)(x,y) = \sum_{i,j} (-a((x-i)^2 + (y-j)^2) + b) I(i,j) \quad (25)$$

$$= -a \sum_{i,j} (x^2 - 2xi + i^2) I(i,j) -$$

$$a \sum_{i,j} (y^2 - 2yi + j^2) I(i,j) + b \sum_{i,j} I(i,j)$$

$$= -a \sum_{i,j} (i^2 + j^2) I(i,j) + 2a, x \sum_{i,j} i I(i,j) +$$

$$2ay \sum_{i,j} j I(i,j) + (-a(x^2 + y^2) + b) \sum_{i,j} I(i,j)$$

Applying the formulation in (16) and the definition in (20) shows how to use integral images:

$$(I*p)(x,y) = -a(\mathcal{A}_{20}(x,y) + \mathcal{A}_{02}(x,y)) + 2ax \cdot \mathcal{A}_{10}(x,y) + \quad (26)$$

$$2ay \cdot \mathcal{A}_{01}(x,y) + (-a(x^2+y^2) + b) \cdot \mathcal{A}_{00}(x,y).$$

The use of a parabolic filter response allows the use of the variable threshold and the constant threshold during NME as outlined above, whilst the use of the thresholds is not possible for Laplacian of Gaussian (LOG) filters or difference of Gaussians (DOG) filters, which use convolution to produce a filter response at full image resolution for every scale level.

Since the parabolic filter kernels are normalized by itself, there is no need to do any further normalization step of the response R to the parabolic filter.

According to an embodiment of the invention the transforming unit comprises a feature descriptor calculating unit configured for calculating for each global key point a global feature descriptor characterizing a regional neighborhood of the respective global key point and for calculating for each local key point a local feature descriptor characterizing a regional neighborhood of the local key point;

a descriptor matching unit configured for comparing the one or more local feature descriptors with the one or more global feature descriptors in order to identify matching features in the reference image and in the further image; and a transforming execution unit configured for transforming the further image into the global coordinate system based on the matching features in order to produce the transformed further image;

wherein the feature descriptor calculating unit is configured in such way that the one or more global feature descriptors characterizing the regional neighborhood of the respective global key point and the one or more local feature descriptors characterizing the regional neighborhood of the respective local key point each are represented by a bit vector;

wherein each bit of the bit vector encodes a characteristic of a pixel position in the respective neighborhood;

wherein the respective neighborhood is divided into sectors of a same size;

wherein each sector comprises a group of the pixel positions;

wherein the groups are arranged rotationally symmetric with regard to rotations around the respective key point with a rotation angle, which is equal to a central angle of the sectors or a multiple of the central angle of the sectors; and wherein all bits of the bit vector are arranged in such order that a bit shift operation of the bit vector, in which a number of the shifted bits is equal to a number of bits per group, is equivalent to a rotation of the respective neighborhood by the central angle.

The following explanations refer to global feature descriptors as well as to local feature descriptors. Feature descriptors vary with a change of appearance of an object in the image. Robust feature matching under realistic circumstances may use invariance of the descriptors to certain changes. Various descriptors offer invariance to different aspects of appearance, including changing image brightness or contrast, image rotation or scaling, or even an affine transformation of the image region (due to a change of perspective). If a certain variance is expected for a given problem, a feature descriptor behaving invariantly to such changes of appearance facilitates feature matching. On the other hand, this comes at the price of lower descriptor distinctiveness, since the difference of appearance of two different objects may not be distinguishable any more by the descriptor.

A feature descriptor should only be rotation invariant if significant in-plane rotation is expected to occur between the moving and the fixed image. In this respect, endoscopic image stitching poses a challenging hybrid scenario, since in-plane rotation is only significant for non-consecutive video frames. To detect corresponding features over a large amount of time, the descriptor needs to be invariant to rotation, while for consecutive video frames, rotation-invariance is not desirable. The straight-forward way of dealing with these mixed requirements is to calculate each feature descriptor twice—with and without normalized direction. This subsection presents a descriptor design to reduce this computational redundancy. It allows to quickly switch between a rotation-invariant and a non-rotation-invariant representation without the necessity to recalculate the descriptor from the image data.

The feature descriptor is represented as a binary vector encoding the intensity relation of pixel positions within the key point neighborhood. The order of bits is chosen according to sectors to achieve quick rotation normalization. The circular key point neighborhood is divided into T sectors. All bits, encoding a group of pixels from the same sector are located next to each other within the descriptor vector. Also, the spatial relations of the pixels of a sector are identical for all sectors. That way, the set of pixel groups is rotationally symmetric with regard to rotations of 360°/T. As a consequence, rotating the descriptor by an angle θ (0°≤θ≤360°) results in a circular shift operation of the bit vector by $$s_\theta = \left\lfloor \frac{\theta}{360°} T \right\rfloor \cdot \frac{N}{T} \tag{27}$$

bits, with N being the length of the descriptor vector. If the reference direction θ (or its corresponding bit shift $s_\theta$) is stored with each key point, a descriptor only needs to be calculated once and rotation invariance can be achieved at any time on demand. Normalizing its orientation may only use a simple circular bit shift operation. An additional advantage of this descriptor setup is the fact that no look-up table may be used to calculate a rotation normalized descriptor. Binary Robust Invariant Scalable Key Points (BRISK) and Fast Retina Key Points (FREAK) suggested look-up tables of 40 MB and 7 MB respectively, to implement rotation normalization [2], [4].

In a further aspect the invention provides a camera system for producing in real-time a digital composite image, the camera system comprising:

a camera device configured for recording a sequence of digital images, in particular an endoscopic camera device configured for recording a sequence of digital images of an interior of a hollow structure; and an image processing device according to the invention.

Furthermore, the invention provides a method for producing in real-time a digital composite image from a sequence of digital images recorded by a camera, in particular by an endoscopic camera, so that the composite image has a wider field of view than the images of the sequence of images, the method comprising the steps:

selecting a reference image and a further image from the sequence of images by using a selecting unit, wherein the reference image is specified in a global coordinate system of the composite image, wherein the further image is specified in a local coordinate system of the further image, and wherein the further image is overlapping the reference image;

detecting one or more global key points in the reference image and detecting one or more local key points in the further image by using a key point detection unit;

wherein a filter response for the reference image and a filter response for the further image are produced by using a filter of the key point detection unit;

wherein the one or more global key points are detected by detecting local maxima in the filter response for the reference image and the one or more local key points are detected by detecting local maxima in the filter response for the further image by executing steps i) to iii) separately for the filter response for the reference image and for the filter response for the further image by using a maximum detection unit of the key point detection unit, wherein a variable threshold is used, wherein steps i) to iii) are defined as:
i) creating blocks by dividing the respective filter response,
ii) calculating the variable threshold,
iii) discarding those blocks of the blocks from further consideration, in which the respective filter response at a reference point of the respective block is less than the respective variable threshold;
transforming the further image into the global coordinate system by using a transforming unit based on at least one of the one or more global key points and based on at least one of the one or more local key points in order to produce a transformed further image; and
joining the reference image and the transformed further image in the global coordinate system by using a joining unit in order to produce at least a part of the composite image.

Moreover, the invention provides a computer program for, when running on a processor, executing the method according to the invention.

BRIEF DESCRIPTION OF THE DRAWINGS

Embodiments of the present invention will be detailed subsequently referring to the appended drawings, in which:

FIG. 2 illustrates the functionalities of a maximum detection unit of an embodiment of an image processing device according to the invention in a schematic view;

DETAILED DESCRIPTION OF THE INVENTION

Figure 1:
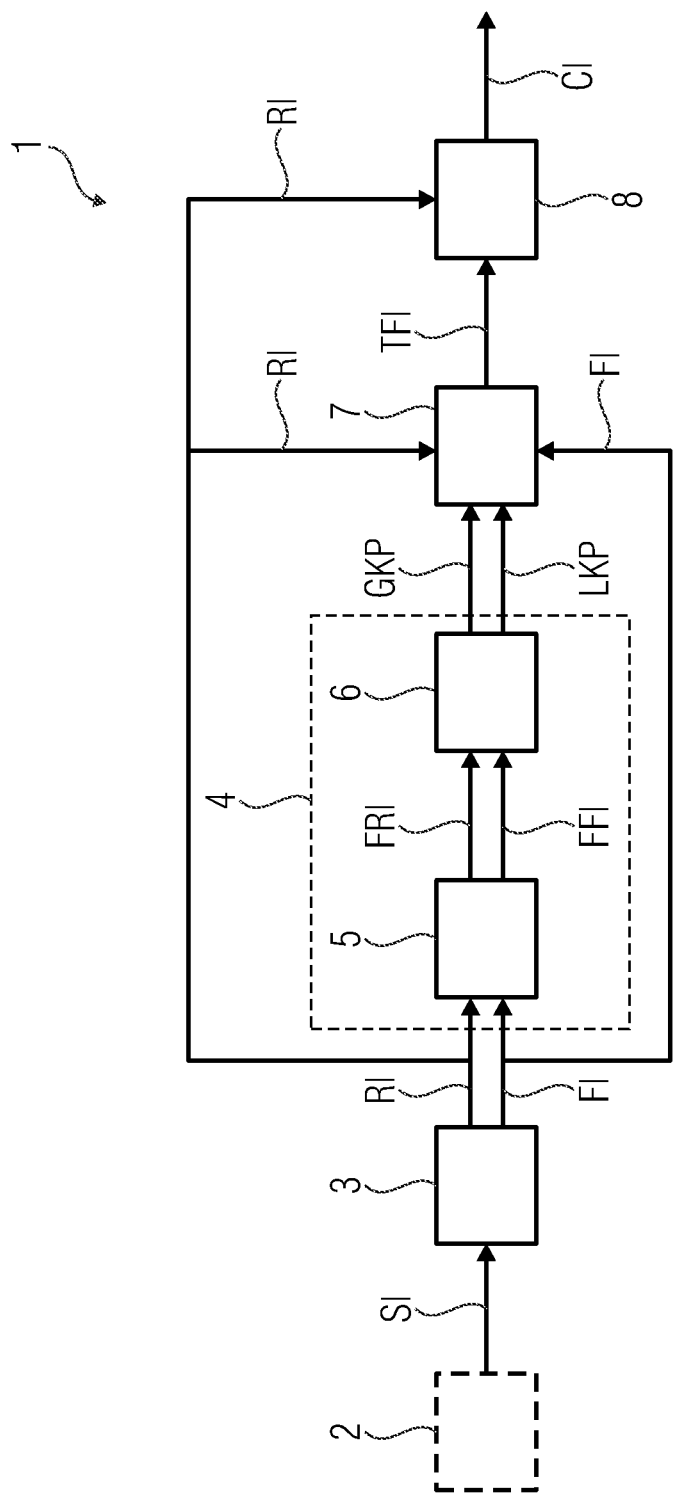
FIG. 1 illustrates an embodiment of an image processing device according to the invention in a schematic view.

Equal or equivalent elements or elements with equal or equivalent functionality are denoted in the following description by equal or equivalent reference numerals.

In the following description, a plurality of details is set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

FIG. 1 illustrates an embodiment of an image processing device 1 according to the invention in a schematic view.

The image processing device 1 is configured for producing in real-time a digital composite image CI from a sequence SI of digital images recorded by a camera device 2, in particular an endoscopic camera device 2, so that the composite image CI has a wider field of view than the images of the sequence SI of images. The image processing device 1 comprises:
a selecting unit 3 configured for selecting a reference image RI and a further image FI from the sequence of images SI, wherein the reference image RI is specified in a global coordinate system of the composite image CI, wherein the further image FI is specified in a local coordinate system of the further image FI, and wherein the further image FI is overlapping the reference image RI;
a key point detection unit 4 configured for detecting one or more global key points GKP in the reference image RI and for detecting one or more local key points LKP in the further image FI,
wherein the key point detection unit 4 comprises a filter 5 configured for producing a filter response FRI for the reference image RI and for producing a filter response FFI for the further image FI,
wherein the key point detection unit 4 comprises a maximum detection unit 6 configured for detecting the one or more global key points GKP by detecting local maxima in the filter response FRI for the reference image RI and for detecting the one or more local key points LKP by detecting local maxima in the filter response FFI for the further image FI by executing following steps separately for the filter response FRI for the reference image RI and for the filter response FFI for the further image FI, wherein a variable threshold VTR is used:
i) creating blocks BL by dividing the respective filter response FRI, FFI,
ii) calculating the variable threshold VTR,
iii) discarding those blocks BL of the blocks BL from further consideration, in which the respective filter response FRI, FFI at a reference point RP of the respective block BL is less than the respective variable threshold VTR;
a transforming unit 7 configured for transforming the further image FI into the global coordinate system based on at least one of the one or more global key points GKP and based on at least one of the one or more local key points LKP in order to produce a transformed further image TFI; and
a joining unit 8 configured for joining the reference image RI and the transformed further image TFI in the global coordinate system in order to produce at least a part of the composite image CI.

According to an embodiment of the invention the maximum detection unit 6 is configured for executing following steps each time after executing step iii), wherein a constant threshold CTR is used:
iv) determining those blocks BL from the blocks BL not being discarded in step iii), in which the respective filter response FRI, FFI at the reference point RP of the respective block BL exceeds the constant threshold CTR,
v) comparing for the determined blocks BL the respective filter response FRI, FFI at the reference point RP with the respective filter response FRI, FFI at points AP adjacent to the reference point RP in order to determine whether one of the local maxima is detected at the reference point RP.

According to an embodiment of the invention the maximum detection unit 6 is configured for executing following steps each time after executing step iii) until a truncation condition occurs:

vi) creating blocks BL by dividing the blocks BL not being discarded in step iii), vii) executing of steps ii to vi for the blocks BL created in step vi).

According to an embodiment of the invention the maximum detection unit 6 is configured for dividing the filter response FRI, FFI in step i) as a function of a scale level and a number of levels per octave in such way that the blocks BL all have a same size.

According to an embodiment of the invention the maximum detection unit 6 is configured for creating the blocks BL in step vi) in such way that the size of the blocks BL not being discarded in step iii is divided in halves for all dimensions.

According to an embodiment of the invention the maximum detection unit 6 is configured for calculating the variable threshold VTR in step ii) as a function of a dimension of the blocks BL, a size of the filter 5 and the constant threshold CTR.

According to an embodiment of the invention the maximum detection unit 6 is configured for using a central point of the respective block BL as the reference point RP of the respective block BL in step iii).

According to an embodiment of the invention the filter 5 is configured in such way that each of the filter response FRI for the reference image RI and the filter response FFI for the further image FI is equivalent to an absolute difference of two smoothing filter responses of the respective image RI, FI at different levels of a scale space.

According to embodiment of the invention each of the two smoothing filter responses is a parabolic filter response.

In another aspect the invention provides a camera system for producing in real-time a digital composite image CI, which comprises:

a camera device 2 configured for recording a sequence SI of digital images, in particular an endoscopic camera device 2 configured for recording a sequence of digital images of an interior of a hollow structure; and an image processing device 1 according to the invention.

In a further aspect the invention provides a method for producing in real-time a digital composite image CI from a sequence SI of digital images recorded by a camera device 2, in particular by an endoscopic camera device 2, so that the composite image CI has a wider field of view than the images of the sequence SI of images, the method comprising the steps:

selecting a reference image RI and a further image FI from the sequence SI of images by using a selecting unit 3, wherein the reference image RI is specified in a global coordinate system of the composite image CI, wherein the further image FI is specified in a local coordinate system of the further image FI, and wherein the further image FI is overlapping the reference image RI;

detecting one or more global key points GKP in the reference image RI and detecting one or more local key points LKP in the further image FI by using a key point detection unit 4;

wherein a filter response FRI for the reference image RI and a filter response FFI for the further image FI are produced by using a filter 5 of the key point detection unit 4, wherein the one or more global key points GKP are detected by detecting local maxima in the filter response FRI for the reference image RI and the one or more local key points LKP are detected by detecting local maxima in the filter response FFI for the further image FI by executing steps i to iii separately for the filter response RFI for the reference image RI and for the filter response FFI for the further image FI by using a maximum detection unit 6 of the key point detection unit 4, wherein a variable threshold VTR is used, wherein the steps i) to iii) are defined as:

i) creating blocks BL by dividing the respective filter response FRI, FFI, ii) calculating the variable threshold VTR, iii) discarding those blocks BL of the blocks BL from further consideration, in which the respective filter response FRI, FFI at a reference point RP of the respective block BL is less than the respective variable threshold VTR;

transforming the further image FI into the global coordinate system by using a transforming unit 7 based on at least one of the one or more global key points GKP and based on at least one of the one or more local key points LKP in order to produce a transformed further image TFI; and joining the reference image RI and the transformed further image TFI in the global coordinate system by using a joining unit 8 in order to produce at least a part of the composite image CI.

In a further aspect the invention provides a computer program for, when running on a processor, executing the method according to the invention.

FIG. 2 illustrates the functionalities of a maximum detection unit 6 of an embodiment of an image processing device 1 according to the invention in a schematic view. The maximum detection unit 6 is configured for detecting one or more global key points GKP by detecting local maxima in the filter response FRI for the reference image RI and for detecting the one or more local key points LKP by detecting local maxima in the filter response FFI for the further image FI by executing steps i) to iii), and optionally iv) to vii), separately for the filter response FRI for the reference image RI and for the filter response FFI for the further image FI. The steps i) to vii) are conducted in the same way for the reference image RI and for the further image FI so that they are explained in the following only once.

The filter response, which is the filter response FRI for a reference image RI or the filter response FFI for a further image FI, and the blocks BL are shown for a simplified two-dimensional case. In practice the respective filter response RFI, FFI and the blocks BL usually are three-dimensional.

In step i) the respective filter response FRI, FFI is divided into four blocks $BL_1$ to $BL_4$. Then, a variable threshold VTR having an exemplary value of t=4 is calculated for the blocks $BL_1$ to $BL_4$ in step ii). After that, the values R of the respective filter response FRI, FFI at the reference point RP of each of the blocks $BL_1$ to $BL_4$ is determined. In the example of FIG. 2 the values are: R=3.8 for block $BL_1$, R=4.2 for block $BL_2$, R=6.5 for block $BL_3$ and R=4.2 for block $BL_4$. As the variable threshold VTR has a value of t=4 the values R of the respective filter response FRI, FFI at the reference point RP of blocks $BL_1$ and $BL_4$ are less than the variable threshold VTR so that blocks $BL_1$ and $BL_4$ are discarded from further consideration. In other words, no further actions will be taken in order to find local maxima in blocks $BL_1$ and $BL_4$.

In step iv) the values R of the remaining blocks $BL_2$ and $BL_3$ are compared to a constant threshold CTR, which has an exemplary value of T=6. As the value R of block $BL_3$ exceeds the constant threshold CTR, a local maxima search is conducted by comparing the value of the filter response at the reference point RP with the values of the respective filter response at points AP adjacent to the reference point RP in step v).

As blocks $BL_2$ and $BL_3$ have not been discarded in step iii), block $BL_2$ is divided in order to create blocks $BL_{21}$, $BL_{22}$, $BL_{23}$ and $BL_{24}$ and block $BL_3$ is divided in order to create blocks $BL_{31}$, $BL_{32}$, $BL_{33}$ and $BL_{34}$ in step vi).

In step vii) the blocks $BL_{21}$, $BL_{22}$, $BL_{23}$, $BL_{24}$, $BL_{31}$, $BL_{32}$, $BL_{33}$ and $BL_{34}$ are processed by repeating the steps ii) to vi).

Figure 3:
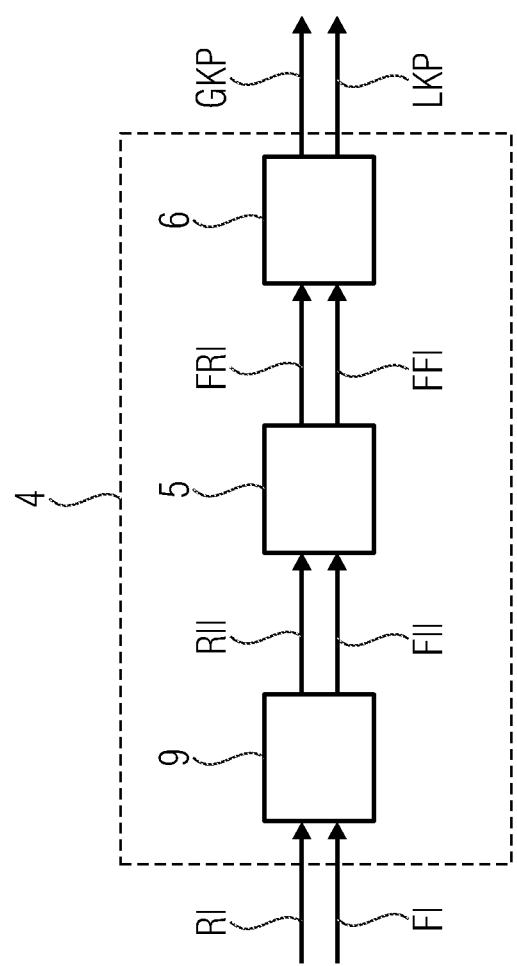
FIG. 3 illustrates a key point detection unit of an embodiment of an image processing device according to the invention in a schematic view.

FIG. 3 illustrates a key point detection unit 4 of an embodiment of an image processing device 1 according to the invention in a schematic view.

According to an embodiment of the invention the key point detection unit 4 comprises an integral image calculator 9 configured for calculating a reference integral image RII from the reference image RI and a further integral image FII from the further image FI, wherein the filter response FRI for the reference image RI is produced by feeding the reference integral image RII to the filter 5 and wherein the filter response FFI for the further image FI is produced by feeding the further integral image FII to the filter 5.

Figure 4:
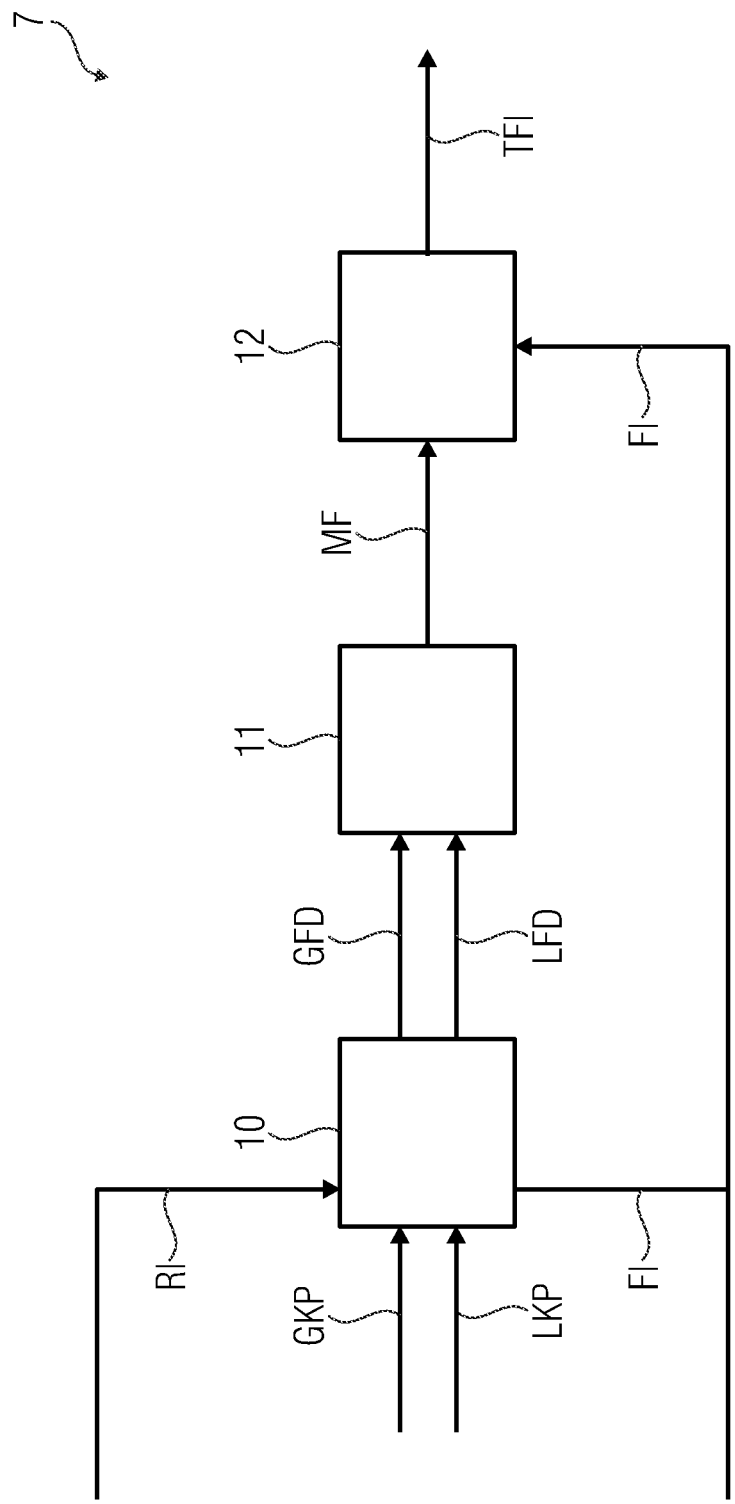
FIG. 4 illustrates a transforming unit of an embodiment of an image processing device according to the invention in a schematic view.

FIG. 4 illustrates a transforming unit 7 of an embodiment of an image processing device 1 according to the invention in a schematic view.

According to an embodiment of the invention the transforming unit 7 comprises
a feature descriptor calculating unit 10 configured for calculating for each global key point GKP a global feature descriptor GFD characterizing a regional neighborhood RNH of the respective global key point GKP and for calculating for each local key point LKP a local feature descriptor LFD characterizing a regional neighborhood RNH of the respective local key point LKP;
a descriptor matching unit 11 configured for comparing the one or more local feature descriptors LFD with the one or more global feature descriptors GFD in order to identify matching features in the reference image RI and in the further image FI; and
an transforming execution unit 12 configured for transforming the further image FI into the global coordinate system based on the matching features in order to produce the transformed further image TFI;
wherein the feature descriptor calculating unit 10 is configured in such way that the one or more global feature descriptors GFD characterizing the regional neighborhood RNH of the respective global key point GKP and the one or more local feature descriptors LFD characterizing the regional neighborhood RNH of the respective local key point LKP each are represented by a bit vector BV;
wherein each bit of the respective bit vector BV encodes a characteristic of a pixel position PP in the respective regional neighborhood RNH;
wherein the respective regional neighborhood RNH is divided into sectors SE of a same size;
wherein each sector SE comprises a group of the pixel positions PP;
wherein the groups are arranged rotationally symmetric with regard to rotations around the respective key point GKP, LKP with a rotation angle, which is equal to a central angle CA of the sectors SE or a multiple of the central angle CA of the sectors SE; and
wherein all bits of the bit vector BV are arranged in such order that a bit shift operation of the bit vector BV, in which a number of the shifted bits is equal to a number of bits per group, is equivalent to a rotation of the respective regional neighborhood RNH by the central angle CA.

Figure 5:
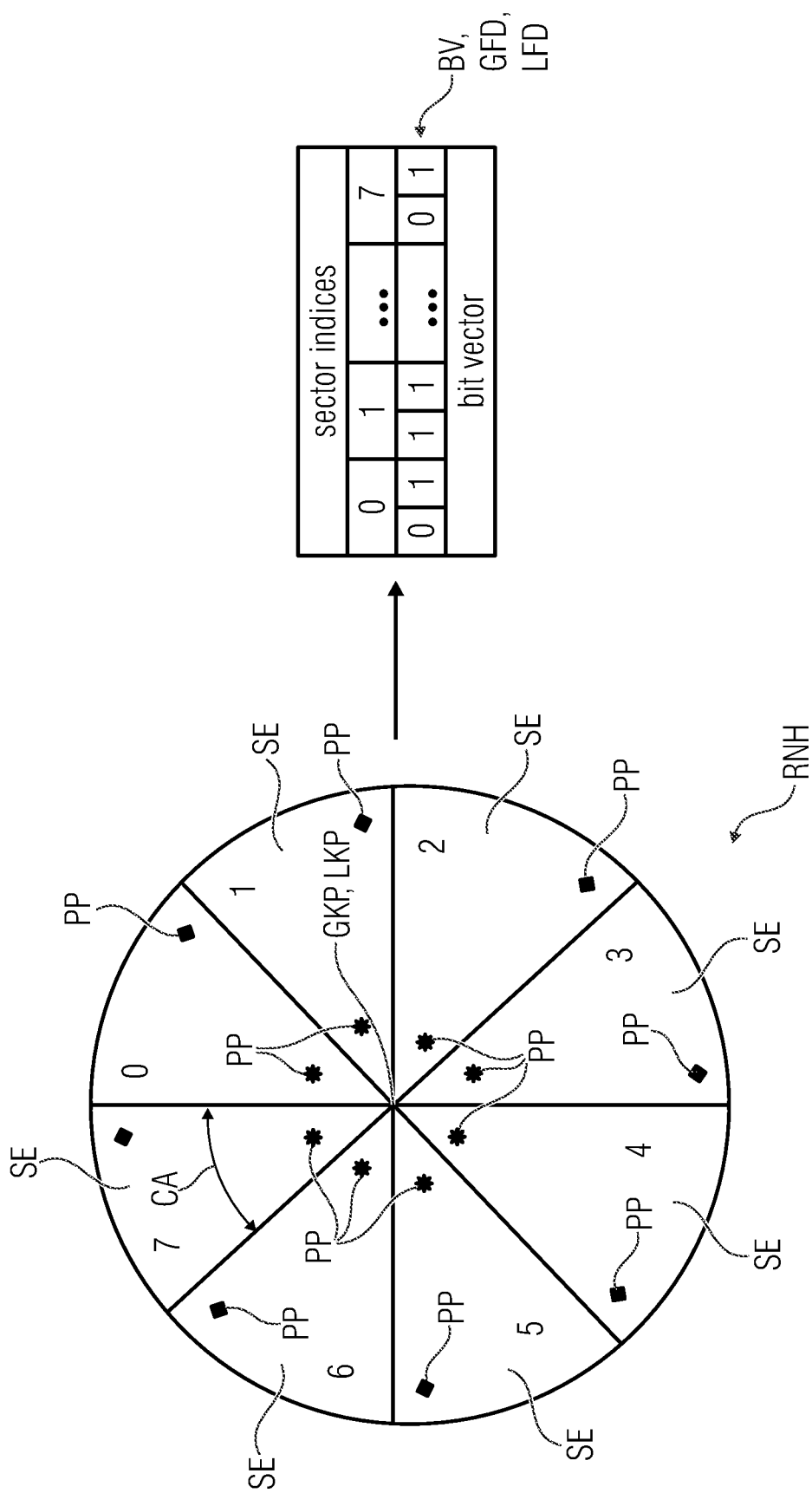
FIG. 5 illustrates a feature descriptor calculated by a feature descriptor calculating unit of an embodiment of an image processing device according to the invention in a schematic view.

FIG. 5 illustrates a feature descriptor GFD, LFD calculated by a feature descriptor calculating unit 10 of an embodiment of an image processing device 1 according to the invention in a schematic view.

The bit vector BV shown in FIG. 5 and may represent either a global feature descriptor GFD for a global key point GKP or a local feature descriptor LFD for local key point LKP.

The regional neighborhood RNH of the respective key point GKP, LKP is, as an example, divided into eight sectors SE. Each of the sectors SV has an exemplary central angle CA of 45° and, thus, the same size. Each sector comprises, as an example, a group of two pixel positions PP. The groups of pixel positions PP are arranged rotationally symmetric with regard to rotations around the respective key point GKP, LKP with a rotational angle, which is equal to 45° or a multiple of 45°.

Audit bits of the bit vector BV are arranged in such order that the bit shift operation of the bit vector BV in which the number of shifted bits is two is equivalent to a rotation of the regional neighborhood RNH by 45°.

Depending on certain implementation requirements, embodiments of the inventive device and system can be implemented in hardware and/or in software. The implementation can be performed using a digital storage medium, for example a floppy disk, a DVD, a Blu-ray Disc, a CD, a ROM, a PROM, an EPROM, an EEPROM or a FLASH memory, having electronically readable control signals stored thereon, which cooperate (or are capable of cooperating) with a programmable computer system such that one or more or all of the functionalities of the inventive device or system is performed.

In some embodiments, a programmable logic device (for example a field programmable gate array) may be used to perform one or more or all of the functionalities of the devices and systems described herein. In some embodiments, a field programmable gate array may cooperate with a microprocessor in order to perform one or more or all of the functionalities of the devices and systems described herein.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the inventive method can be implemented using an apparatus comprising hardware and/or software. The implementation can be performed using a digital storage medium, for example a floppy disk, a DVD, a Blu-ray Disc, a CD, a ROM, a PROM, an EPROM, an EEPROM or a FLASH memory, having electronically readable control signals stored thereon, which cooperate (or are capable of cooperating) with a programmable computer system such that the respective method is performed.

Depending on certain implementation requirements, embodiments of the inventive method can be implemented using an apparatus comprising hardware and/or software.

Some or all of the method steps may be executed by (or using) a hardware apparatus, like a microprocessor, a programmable computer or an electronic circuit. Some one or more of the most important method steps may be executed by such an apparatus.

Some embodiments according to the invention comprise a data carrier having electronically readable control signals, which are capable of cooperating with a programmable computer system such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, which is stored on a machine readable carrier or a non-transitory storage medium.

A further embodiment comprises a processing means, for example a computer, or a programmable logic device, in particular a processor comprising hardware, configured or adapted to perform one of the methods described herein.

A further embodiment comprises a computer having installed thereon the computer program for performing one of the methods described herein.

Generally, the methods are advantageously performed by any apparatus comprising hardware and or software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Motilal Agrawal, Kurt Konolige, and Morten Rufus Blas. CenSurE: Center Surround Extremas for Realtime Feature Detection and Matching. In David Forsyth, Philip Torr, and Andrew Zisserman, editors, *European Conference On Computer Vision (ECCV)*, Lecture Notes in Computer Science, pages 102-115. Springer Berlin Heidelberg, 2008. 00255.

[2] A. Alahi, R. Ortiz, and P. Vandergheynst. FREAK: Fast Retina Keypoint. In *IEEE Conference on Computer Vision and Pattern Recognition (CVPR)*, pages 510-517, 2012. 00264.

[3] Wolfgang Förstner and Eberhard Gülch. A fast operator for detection and precise location of distinct points, corners and centres of circular features. In *Intercommission Conference on Fast Processing of Photogrammetric Data (ISPRS)*, pages 281-305, 1987. 00953.

[4] S. Leutenegger, M. Chli, and R. Y. Siegwart. BRISK: Binary Robust invariant scalable key points. In *IEEE International Conference on Computer Vision (ICCV)*, pages 2548-2555, 2011. 00398.

[5] David G. Lowe. Distinctive Image Features from Scale-Invariant Keypoints. *International Journal of Computer Vision*, 60(2):91-110, 2004. 21859.

[6] Alexander Neubeck and Luc Van Gool. Efficient Non-Maximum Suppression. In *International Conference on Pattern Recognition (ICPR)*, volume 3, pages 850-855, 2006. 00075.

[7] Tuan Q. Pham. Non-maximum suppression using fewer than two comparisons per pixel. In *International Conference on Advanced Concepts for Intelligent Vision Systems (ACIVS)*, pages 438-451. Springer Berlin Heidelberg, 2010. 00009.

The invention claimed is:

1. An image processing device for producing in real-time a digital composite image from a sequence of digital images recorded by a camera device, in particular an endoscopic camera device, so that the composite image comprises a wider field of view than the images of the sequence of images, the image processing device comprising:
 a selecting unit configured for selecting a reference image and a further image from the sequence of images, wherein the reference image is specified in a global coordinate system of the composite image, wherein the further image is specified in a local coordinate system of the further image, and wherein the further image is overlapping the reference image;
 a key point detection unit configured for detecting one or more global key points in the reference image and for detecting one or more local key points in the further image,
  wherein the key point detection unit comprises a smoothing filter configured for producing a filter response for the reference image and for producing a filter response for the further image,
  wherein the key point detection unit comprises a maximum detection unit configured for detecting the one or more global key points by detecting local maxima in the filter response for the reference image and for detecting the one or more local key points by detecting local maxima in the filter response for the further image by executing the following separately for the filter response for the reference image and for the filter response for the further image, wherein a variable threshold is used:
   i) creating blocks by dividing the respective filter response,
   ii) calculating the variable threshold,
   iii) discarding those blocks of the blocks from further consideration, in which the respective filter response at a reference point of the respective block is less than the respective variable threshold;
 a transforming unit configured for transforming the further image into the global coordinate system based on at least one of the one or more global key points and based on at least one of the one or more local key points in order to produce a transformed further image; and
 a joining unit configured for joining the reference image and the transformed further image in the global coordinate system in order to produce at least a part of the composite image;
 wherein the maximum detection unit is configured for executing the following each time after executing iii), wherein a constant threshold is used:
   iv) determining those blocks from the blocks not being discarded in iii), in which the respective filter response at the reference point of the respective block exceeds the constant threshold,
   v) comparing for the determined blocks the respective filter response at the reference point with the respective filter response at points adjacent to the reference point in order to determine whether one of the local maxima is detected at the reference point; and
 wherein the maximum detection unit is configured for calculating the variable threshold in ii) as a function of a dimension of the blocks, a size of the smoothing filter, the constant threshold and a steering parameter for adjusting between a high detection rate and a short computation time.

2. The image processing device according to claim 1, wherein the maximum detection unit is configured for executing the following each time after executing iii) until a truncation condition occurs:
   vi) creating blocks by dividing the blocks not being discarded in iii),
   vii) executing of ii) to vi) for the blocks created in vi).

3. The image processing device according to claim 1, wherein the maximum detection unit is configured for dividing the filter response in i) as a function of a scale level and a number of levels per octave in such way that the blocks all comprise a same size.

4. The image processing device according to claim 1, wherein the maximum detection unit is configured for creating the blocks in vi) in such way that the size of the blocks not being discarded in iii) is divided in halves for all dimensions.

5. The image processing device according to claim 1, wherein the maximum detection unit is configured for using a central point of the respective block as the reference point of the respective block in iii).

6. The image processing device according to claim 1, wherein the key point detection unit comprises an integral image calculator configured for calculating a reference integral image from the reference image and a further integral image from the further image, wherein the filter response for the reference image is produced by feeding the reference integral image to the smoothing filter and wherein the filter response for the further image is produced by feeding the further integral image to the smoothing filter.

7. The image processing device according to claim 1, wherein the smoothing filter is configured in such way that each of the filter response for the reference image and the filter response for the further image is equivalent to an absolute difference of two smoothing filter responses of the respective image at different levels of a scale space.

8. The image processing device according to claim 7, wherein each of the two smoothing filter responses is a parabolic filter response.

9. The image processing device according to claim 1, wherein the transforming unit comprises
   a feature descriptor calculating unit configured for calculating for each global key point a global feature descriptor characterizing a regional neighborhood of the respective global key point and for calculating for each local key point a local feature descriptor characterizing a regional neighborhood of the respective local key point;
   a descriptor matching unit configured for comparing the one or more local feature descriptors with the one or more global feature descriptors in order to identify matching features in the reference image and in the further image; and
   a transforming execution unit configured for transforming the further image into the global coordinate system based on the matching features in order to produce the transformed further image;
   wherein the feature descriptor calculating unit is configured in such way that the one or more global feature descriptors characterizing the regional neighborhood of the respective global key point and the one or more local feature descriptors characterizing the regional neighborhood of the respective local key point each are represented by a bit vector;
   wherein each bit of the respective bit vector encodes a characteristic of a pixel position in the respective regional neighborhood;
   wherein the respective regional neighborhood is divided into sectors of a same size;
   wherein each sector comprises a group of the pixel positions;
   wherein the groups are arranged rotationally symmetric with regard to rotations around the respective key point with a rotation angle, which is equal to a central angle of the sectors or a multiple of the central angle of the sectors; and
   wherein all bits of the bit vector are arranged in such order that a bit shift operation of the bit vector, in which a number of the shifted bits is equal to a number of bits per group, is equivalent to a rotation of the respective regional neighborhood by the central angle.

10. A camera system for producing in real-time a digital composite image, the, the camera system comprising:
    a camera device configured for recording a sequence of digital images, in particular an endoscopic camera device configured for recording a sequence of digital images of an interior of a hollow structure; and
    an image processing device according to claim 1.

11. A method for producing in real-time a digital composite image from a sequence of digital images recorded by a camera device, in particular by an endoscopic camera device, so that the composite image comprises a wider field of view than the images of the sequence of images, the method comprising:
    selecting a reference image and a further image from the sequence of images by using a selecting unit, wherein the reference image is specified in a global coordinate system of the composite image, wherein the further image is specified in a local coordinate system of the further image, and wherein the further image is overlapping the reference image;
    detecting one or more global key points in the reference image and detecting one or more local key points in the further image by using a key point detection unit;
    wherein a filter response for the reference image and a filter response for the further image are produced by using a smoothing filter of the key point detection unit,
    wherein the one or more global key points are detected by detecting local maxima in the filter response for the reference image and the one or more local key points are detected by detecting local maxima in the filter response for the further image by executing i) to iii) separately for the filter response for the reference image and for the filter response for the further image by using a maximum detection unit of the key point detection unit, wherein a variable threshold is used, wherein i) to iii) are defined as:
    i) creating blocks by dividing the respective filter response,
    ii) calculating the variable threshold,
    iii) discarding those blocks of the blocks from further consideration, in which the respective filter response at a reference point of the respective block is less than the respective variable threshold;
    transforming the further image into the global coordinate system by using a transforming unit based on at least one of the one or more global key points and based on at least one of the one or more local key points in order to produce a transformed further image;

joining the reference image and the transformed further image in the global coordinate system by using a joining unit in order to produce at least a part of the composite image; and executing the following each time after executing iii) by using the maximum detection unit, wherein a constant threshold is used:

iv) determining those blocks from the blocks not being discarded in iii), in which the respective filter response at the reference point of the respective block exceeds the constant threshold, v) comparing for the determined blocks the respective filter response at the reference point with the respective filter response at points adjacent to the reference point in order to determine whether one of the local maxima is detected at the reference point;

wherein the maximum detection unit is configured for calculating the variable threshold in ii) as a function of a dimension of the blocks, a size of the smoothing filter, the constant threshold and a steering parameter for adjusting between a high detection rate and a short computation time.

12. A non-transitory digital storage medium having a computer program stored thereon to perform the method for producing in real-time a digital composite image from a sequence of digital images recorded by a camera device, in particular by an endoscopic camera device, so that the composite image comprises a wider field of view than the images of the sequence of images, the method comprising:

selecting a reference image and a further image from the sequence of images by using a selecting unit, wherein the reference image is specified in a global coordinate system of the composite image, wherein the further image is specified in a local coordinate system of the further image, and wherein the further image is overlapping the reference image;

detecting one or more global key points in the reference image and detecting one or more local key points in the further image by using a key point detection unit;

wherein a filter response for the reference image and a filter response for the further image are produced by using a smoothing filter of the key point detection unit, wherein the one or more global key points are detected by detecting local maxima in the filter response for the reference image and the one or more local key points are detected by detecting local maxima in the filter response for the further image by executing i) to iii) separately for the filter response for the reference image and for the filter response for the further image by using a maximum detection unit of the key point detection unit, wherein a variable threshold is used, wherein i) to iii) are defined as:

i) creating blocks by dividing the respective filter response, v) calculating the variable threshold, vi) discarding those blocks of the blocks from further consideration, in which the respective filter response at a reference point of the respective block is less than the respective variable threshold;

transforming the further image into the global coordinate system by using a transforming unit based on at least one of the one or more global key points and based on at least one of the one or more local key points in order to produce a transformed further image;

joining the reference image and the transformed further image in the global coordinate system by using a joining unit in order to produce at least a part of the composite image; and executing the following each time after executing iii) by using the maximum detection unit, wherein a constant threshold is used:

iv) determining those blocks from the blocks not being discarded in iii), in which the respective filter response at the reference point of the respective block exceeds the constant threshold, v) comparing for the determined blocks the respective filter response at the reference point with the respective filter response at points adjacent to the reference point in order to determine whether one of the local maxima is detected at the reference point;

wherein the maximum detection unit is configured for calculating the variable threshold in ii) as a function of a dimension of the blocks, a size of the smoothing filter, the constant threshold and a steering parameter for adjusting between a high detection rate and a short computation time, when said computer program is run by a computer.

* * * * *